(12) United States Patent
Leonard

(10) Patent No.: US 10,890,925 B2
(45) Date of Patent: Jan. 12, 2021

(54) VEHICLE LEVELING SYSTEMS, DEVICES AND METHODS AND COMPUTER PROGRAM PRODUCTS FOR LEVELING VEHICLES USING SMART DEVICES

(71) Applicant: COMMAND ELECTRONICS, LLC, Hickory, NC (US)

(72) Inventor: Charles A. Leonard, Hickory, NC (US)

(73) Assignee: Command Electronics, LLC, Hickory, NC (US)

( * ) Notice: Subject to any disclaimer, the term of this patent is extended or adjusted under 35 U.S.C. 154(b) by 75 days.

(21) Appl. No.: 15/619,261

(22) Filed: Jun. 9, 2017

(65) Prior Publication Data
US 2018/0004230 A1     Jan. 4, 2018

Related U.S. Application Data

(63) Continuation-in-part of application No. 14/961,787, filed on Dec. 7, 2015, now abandoned.
(Continued)

(51) Int. Cl.
*G05D 1/08* (2006.01)
*G05D 1/00* (2006.01)
(Continued)

(52) U.S. Cl.
CPC ............. *G05D 1/0891* (2013.01); *B62D 1/00* (2013.01); *G05D 1/0016* (2013.01); *G07C 5/008* (2013.01);
(Continued)

(58) Field of Classification Search
CPC ...... G05D 1/08; G05D 1/0891; G05D 1/0221; G05D 1/0088; G05D 1/0016; G05D 1/0011; G05D 2201/0213; G05D 1/0061; B60T 17/22; B60T 8/171; B60T 2201/04; B60T 7/22; B60T 8/32; B60T 7/12; B60T 8/1761; B60T 13/662; B62D 1/00; B62D 37/00; B62D 55/075; B62D 57/02;
(Continued)

(56) References Cited

U.S. PATENT DOCUMENTS

| | | | |
|---|---|---|---|
| 3,657,695 A * | 4/1972 | Birmingham | B60D 1/36 340/431 |
| 4,396,202 A * | 8/1983 | Kami | B60G 11/58 267/64.16 |

(Continued)

*Primary Examiner* — Hunter B Lonsberry
*Assistant Examiner* — Luis A Martinez Borrero
(74) *Attorney, Agent, or Firm* — Nexsen Pruet, PLLC; Seth Hudson

(57) ABSTRACT

The present subject matter provides leveling systems and processes for leveling vehicles, such as recreational vehicles. The present subject matter also relates to computer program products for leveling vehicles, such as recreational vehicles, using smart devices. The leveling system can include a sensor device secured to a vehicle to sense at least one of an inclination or an orientation of the vehicle in both a pitch direction and a roll direction. The leveling system can include a smart device in communication with the sensor device to allow information received from the sensor device to be processed to provide measurements to a user and to determine the amount of adjustments needed in height to at least one of the pitch direction or the roll direction to level the vehicle.

20 Claims, 15 Drawing Sheets

Related U.S. Application Data

(60) Provisional application No. 62/088,115, filed on Dec. 5, 2014, provisional application No. 62/101,109, filed on Jan. 8, 2015.

(51) Int. Cl.
  *G07C 5/08* (2006.01)
  *G07C 5/00* (2006.01)
  *B62D 1/00* (2006.01)
  *H04W 84/18* (2009.01)

(52) U.S. Cl.
  CPC ... *G07C 5/0808* (2013.01); *G05D 2201/0213* (2013.01); *H04W 84/18* (2013.01)

(58) Field of Classification Search
  CPC ......... B60W 2420/42; B60W 2520/14; B60W 30/02; B60W 10/20
  See application file for complete search history.

(56) References Cited

U.S. PATENT DOCUMENTS

| | | | | |
|---|---|---|---|---|
| 4,547,972 | A * | 10/1985 | Heidel | G01C 9/06 33/299 |
| 4,709,934 | A * | 12/1987 | Suzuki | B60G 17/016 280/5.514 |
| 4,760,649 | A * | 8/1988 | Preston | B60R 16/0233 33/333 |
| 4,935,883 | A * | 6/1990 | Hulsing, II | G01V 7/00 175/45 |
| 5,136,784 | A * | 8/1992 | Marantz | G01C 9/06 33/333 |
| 6,037,874 | A * | 3/2000 | Heironimus | G01C 9/06 33/366.16 |
| 6,266,590 | B1 * | 7/2001 | Kutscher | B60G 17/0155 280/124.157 |
| 6,293,562 | B1 * | 9/2001 | Kutscher | B60G 17/016 280/5.5 |
| 6,456,194 | B1 * | 9/2002 | Carlson | B60G 17/0165 340/440 |
| 6,584,385 | B1 * | 6/2003 | Ford | B60G 17/0161 180/41 |
| 7,025,361 | B1 * | 4/2006 | Erickson | B60S 9/02 280/6.153 |
| 7,316,406 | B2 * | 1/2008 | Kimura | B60G 17/017 280/6.157 |
| 7,743,520 | B1 * | 6/2010 | Jiorle | G01C 9/28 33/366.11 |
| 7,786,883 | B1 * | 8/2010 | Davison, III | B60P 3/36 340/686.1 |
| 7,815,200 | B2 * | 10/2010 | Bakshi | B60S 9/12 280/6.153 |
| 8,209,086 | B2 * | 6/2012 | Ohashi | B60G 17/04 701/37 |
| 8,239,162 | B2 * | 8/2012 | Tanenhaus | G01P 15/00 702/151 |
| 9,223,302 | B2 * | 12/2015 | Maurer | B60S 9/02 |
| 9,348,012 | B2 * | 5/2016 | Watanabe | G01S 15/872 |
| 9,421,907 | B2 * | 8/2016 | Carpani | G01C 9/00 |
| 9,597,961 | B2 * | 3/2017 | Tran | B60K 35/00 |
| 9,701,199 | B2 * | 7/2017 | Miuchi | B62D 15/0295 |
| 10,086,954 | B2 * | 10/2018 | Zhong | B64C 39/024 |
| 10,427,654 | B2 * | 10/2019 | Garceau | B60S 9/12 |
| 2007/0180719 | A1 * | 8/2007 | Donnelly | B60S 9/02 33/366.11 |
| 2008/0142768 | A1 * | 6/2008 | Thorpe | B60S 9/12 254/423 |
| 2009/0005930 | A1 * | 1/2009 | Koebrick | B60P 3/36 701/36 |
| 2009/0062985 | A1 * | 3/2009 | Ohashi | B60G 17/04 701/37 |
| 2009/0112389 | A1 * | 4/2009 | Yamamoto | G08G 1/167 701/31.4 |
| 2010/0194602 | A1 * | 8/2010 | Engels | G01C 23/00 340/979 |
| 2012/0197587 | A1 * | 8/2012 | Luk | B60W 40/09 702/141 |
| 2012/0208520 | A1 * | 8/2012 | Howarter | B60R 25/24 455/420 |
| 2012/0256768 | A1 * | 10/2012 | Kratchounova | H04N 13/349 340/973 |
| 2013/0038714 | A1 * | 2/2013 | Ichinose | B60R 1/00 348/118 |
| 2015/0160009 | A1 * | 6/2015 | Bank | G01C 15/002 33/228 |
| 2015/0352956 | A1 * | 12/2015 | Miuchi | B60W 40/10 701/41 |
| 2015/0375680 | A1 * | 12/2015 | Watanabe | B60K 35/00 701/36 |
| 2016/0060824 | A1 * | 3/2016 | Akashi | H04N 7/18 348/148 |
| 2016/0117853 | A1 * | 4/2016 | Zhong | B64D 47/08 345/634 |
| 2016/0161944 | A1 * | 6/2016 | Leonard | G05D 1/0016 701/2 |
| 2017/0021939 | A1 * | 1/2017 | Crosta | B64C 13/0421 |
| 2019/0016475 | A1 * | 1/2019 | Zhong | B64D 47/08 |
| 2019/0079508 | A1 * | 3/2019 | Gingold | G05D 1/0891 |

* cited by examiner

VEHICLE LEVELING SYSTEMS, DEVICES AND METHODS AND COMPUTER PROGRAM PRODUCTS FOR LEVELING VEHICLES USING SMART DEVICES

RELATED APPLICATIONS

The presently disclosed subject matter claims the benefit of U.S. patent application Ser. No. 14/961,787, filed Dec. 7, 2015, which claims the benefit of U.S. Provisional Patent Application Ser. No. 62/088,115, filed Dec. 5, 2014, and U.S. Provisional Patent Application Ser. No. 62/101,109, filed Jan. 8, 2015; the disclosures of these three applications are incorporated herein by reference in their entireties.

TECHNICAL FIELD

The present subject matter relates to leveling systems and processes for leveling vehicles, such as recreational vehicles. The present subject matter also relates to computer program products for leveling vehicles, such as recreational vehicles, using smart devices.

BACKGROUND

Whether in a storage or use state, a recreational vehicle (RV) should be leveled for both practical and technical reasons. Practical reasons include a level floor, proper door swings, stove and sink use, as well as many others. Technical reasons include proper operation of the ammonia based refrigerator, level holding tanks for proper level detection by electronic means and for the proper operation of the plumbing and various other systems. Some higher end Class A RV's have onboard leveling systems that utilize digital sensors and hydraulic jacks, but most do not have any native leveling capability beyond the raising and lowering of the front of the RV using manual or electric jacks. Level indicators are generally bubble levels attached to both the side and front or rear of the RV. In addition, there are many other vehicles and trailers that require a level position to operate properly such as food vending trucks, mobile medical trailers, transport trailers and in some cases heavy equipment although there are many others.

The described device provides leveling indication for the 2 main axes of the RV (side-to-side and front-to-back). For the purposes of describing both the typical and proposed leveling method, each will be defined as the angle of the RV from front to back and roll will be defined as the angle of the RV from side to side.

The typical RV leveling method is described. Once the RV has been moved into the desired location and orientation for use, the driver must exit the RV or tow vehicle to inspect the current level condition of the RV by using the bubble levels attached to the RV. The first step is to level the roll of the RV. Typically this is done by driving or towing the appropriate RV wheels onto a board, block or other object to raise one side of the RV closer to level. Since the bubble levels being used do not give any exact information regarding the amount the RV is out of level, it is an educated guess at best to determine just how high the appropriate wheels must be raised. Typically, this is a trial and error system requiring the driver to make multiple attempts at raising the appropriate wheels the necessary amount to achieve a level position. Each attempt requires the driver to get hack into the vehicle to move the wheels off of the previously placed object being used to raise wheels, exit the vehicle to add or take away from the height of the object being used to raise the wheels, enter the vehicle again to drive or tow the wheels back onto the object being used to raise the wheels and finally exiting the vehicle again to check the new roll orientation relative to level. It is not uncommon for this process to be repeated several times to achieve a level roll orientation. If bubble levels are being used to determine a level orientation, it is common knowledge that a bubble between the lines on a bubble level has an error range of 2-3 degrees. This can be a significant error amount as it relates to RV's and can cause doors, plumbing and other objects and systems within the RV not to operate property. Once the roll orientation is level, the pitch orientation leveling operation must be completed. Typically, the bubble level mounted to the side of the RV will be used in this process. In the case of a towable RV, this process generally involves using the jack(s) on the front of the RV to raise or lower the front of the RV until a level position is achieved. Since the upward travel of the jack(s) is limited, it is sometimes required to place blocks or some other object under the jack to enable the jack(s) to raise the front of the RV high enough to achieve a level position. Placing blocks or other objects under the jack(s) requires the RV to be reattached to the tow vehicle, the jack(s) raised, blocks or objects placed under the jack(s), the jack(s) lowered onto the blocks or objects and then released from the tow vehicle. In the case of a driveable RV, the same iterative process used to level the roll of the RV is necessary to level the pitch of the RV. This process may require many attempts as in the case of leveling the roll of the RV.

As such, a need exists for a system for easily and inexpensively leveling a recreational vehicle that does require not many attempts to achieve a level balance of the recreational vehicle in both the pitch and the roll directions.

SUMMARY

The present subject matter provides leveling vehicles, such as recreational vehicles, and related systems and processes.

The present subject matter also relates to computer program products for leveling vehicles, such as recreational vehicles, using smart devices. The subject matter described herein may be implemented in software, in combination with hardware and/or firmware. For example, the subject matter described herein may be implemented in software executed by a hardware-enabled processor. In one exemplary implementation, the subject matter described herein of using leveling information for leveling a vehicle, such as a recreational vehicle may be implemented using a non-transitory computer readable medium having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms. Further, it should be noted that the systems and methods utilize and can comprise recreational vehicle leveling systems, devices and their components and functionality described herein. These recreational vehicle leveling systems and devices constitute special purpose devices that improve the technological field of providing guidance for and/or mechanisms for leveling recreational vehicles.

While one or more objects of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the disclosures and the specification, including reference to the accompanying figures, in which.

Figure 1:
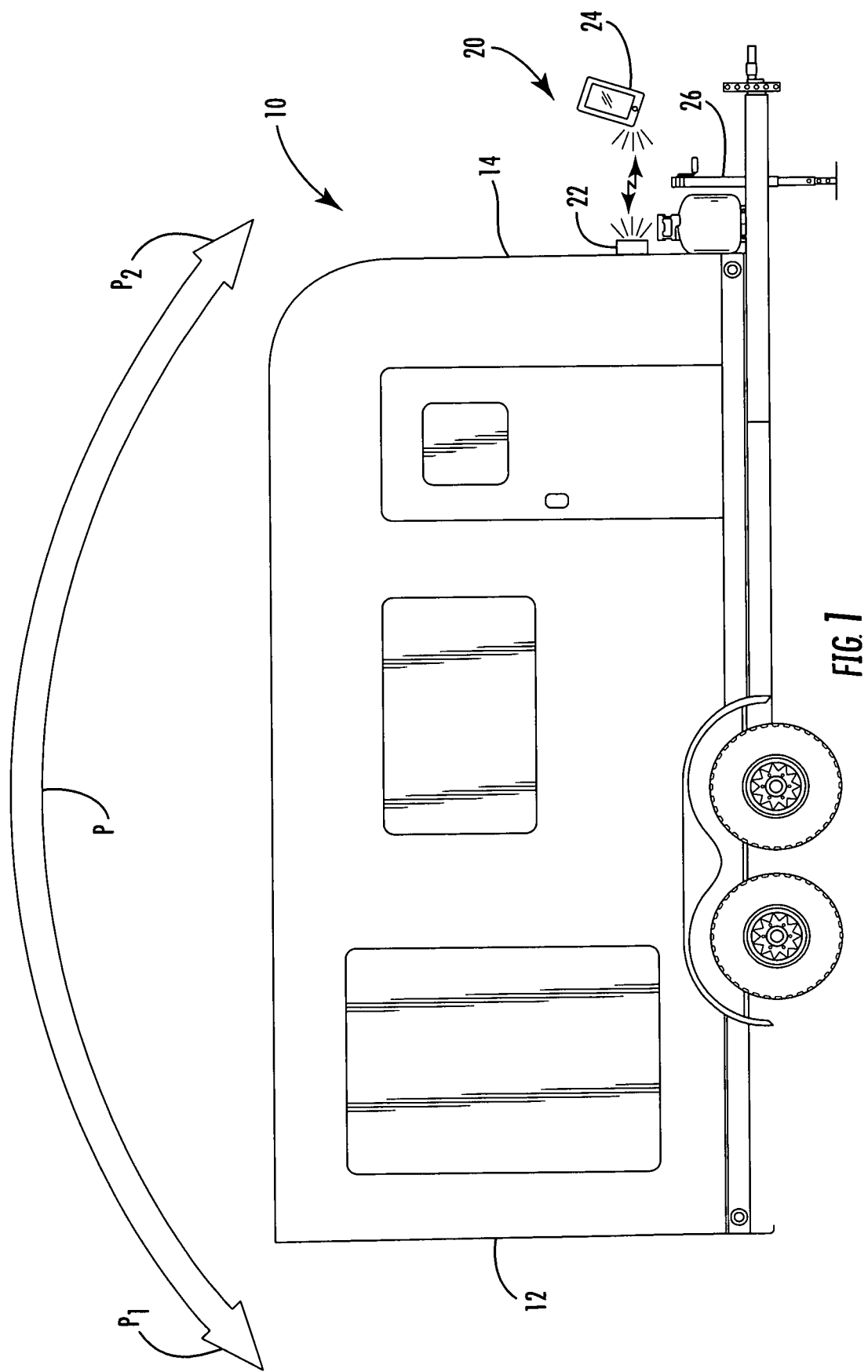
FIG. 1 illustrates a schematic side view of an embodiment of a vehicle that includes an embodiment of a leveling system according to the present subject matter.

Repeat use of reference characters in the present specification and drawings is intended to represent the same or analogous features or elements of the invention.

DETAILED DESCRIPTION

Reference now will be made to the embodiments of the present subject matter, one or more examples of which are set forth below. Each example is provided by way of an explanation of the present subject matter, not as a limitation. In fact, it will be apparent to those skilled in the art that various modifications and variations can be made in the present subject matter without departing from the scope or spirit of the present subject matter. For instance, features illustrated or described as one embodiment can be used on another embodiment to yield still a further embodiment. Thus it is intended that the present subject matter cover such modifications and variations as come within the scope of the appended claims and their equivalents. It is to be understood by one of ordinary skill in the art that the present discussion is a description of exemplary embodiments only, and is not intended as limiting the broader aspects of the present subject matter, which broader aspects are embodied in exemplary constructions.

Although the terms first, second, right, left, front, back, etc. may be used herein to describe various features, elements, components regions, layers and/or sections, these features, elements, components, regions, layers and/or sections should not be limited by these terms. These terms are only used to distinguish one feature, element, component, region, layer or section from another feature, element component, region, layer or section. Thus, a first feature, element, component, region, layer or section discussed below could be termed a second feature, element, component, region, layer or section without departing from the teachings of the disclosure herein.

Similarly, when a layer or coating is being described in the present disclosure as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Embodiments of the subject matter of the disclosure are described herein with reference to schematic illustrations or embodiments that may be idealized. As such, variations from the shapes and/or positions of features, elements or components within the illustrations as a result of, for example but not limited to, user preferences, manufacturing techniques and/or tolerances are expected. Shapes, sizes and/or positions of features, elements or components illustrated in the figures may also be magnified, minimized, exaggerated, shifted or simplified to facilitate explanation of the subject matter disclosed herein. Thus, the features, elements or components illustrated in the figures are schematic in nature and their shapes and/or positions are not intended to illustrate the precise configuration of the subject matter and are not intended to limit the scope of the subject matter disclosed herein.

It is to be understood that the ranges and limits mentioned herein include all ranges located within the prescribed limits (i.e., subranges). For instance, a range from about 100 to about 200 also includes ranges from 110 to 150, 170 to 190, 153 to 162, and 145.3 to 149.6. Further, a limit of up to about 7 also includes a limit of up to about 5, up to 3, and up to about 4.5, as well as ranges within the limit, such as from about 1 to about 5, and from about 3.2 to about 6.5 as examples.

"Smart device," or "mobile smart device," as used herein means any mobile electronic device configured with imaging and/or computing capabilities that can process image and sensor data. Such smart devices can include but are not limited to, at least one of a mobile smartphone, a personal digital assistant (PDA), a computing tablet, a personal media player, or any like mobile electronic device configured with imaging and/or computing capabilities. In some embodiments, the smart device may be provisioned with a hardware-based processor that is configured to execute software programs or applications.

"Vehicle leveling device," and "RV leveling device" as used herein means a sensor device that include at least one of a gyroscope, a digital compass, a tilt sensor, a digital accelerometer or some other digital angle measurement device or sensor therein that includes a software application that permits the sensor device to measure and asset angles of inclination and/or orientation of a recreational vehicle to permit the pitch and roll of the recreational vehicle to be adjusted to level the recreational vehicle. A digital temperature sensor may also be included on the vehicle leveling device and used to collect temperature data necessary to correct variations or irregularities in the data obtained by the above mentioned angle measurement sensors. A computer processor may also be included on the vehicle leveling device and used to perform calculations, security functions, storage management and functions well as other tasks. Firmware associated with the desired functionality may be executed by the computer processor of the vehicle leveling device.

"Vehicle" as used herein means both powered vehicles and non-powered vehicles, trailers or the like, and includes but is not limited to cars, trucks, recreational vehicle, recreational vehicle trailers, food vending trucks, mobile medical trailers, transport trailers, boon trucks, backhoes, or the like.

"Mobile smart device software application" as used herein means specific software applications for and used on a mobile smart device that can be in the form of a non-transitory computer readable medium comprising computer executable instructions embodied in a computer readable medium that when executed by a processor of a computer control of the smart device, the smart device can perform specific steps.

"Software" or "Software application" as used herein means software applications for and used on a computer, which can include, but is not limited to a mobile smart device, that can be in the form of a non-transitory computer readable medium comprising computer executable instructions embodied in a computer readable medium that when executed by a processor of a computer control of the computer, the computer can perform specific steps.

The leveling system, method, device, and/or computer program product embodiments described herein refer mainly to recreation vehicles. There are many other vehicles and trailers that require a level position to operate properly such as food vending trucks, mobile medical trailers, transport trailers and in some cases heavy equipment although there are many others. It should be understood that that leveling system, method, device, and/or computer program product embodiments described herein can be used in conjunction with these other vehicles and/or trailers.

Figure 2:
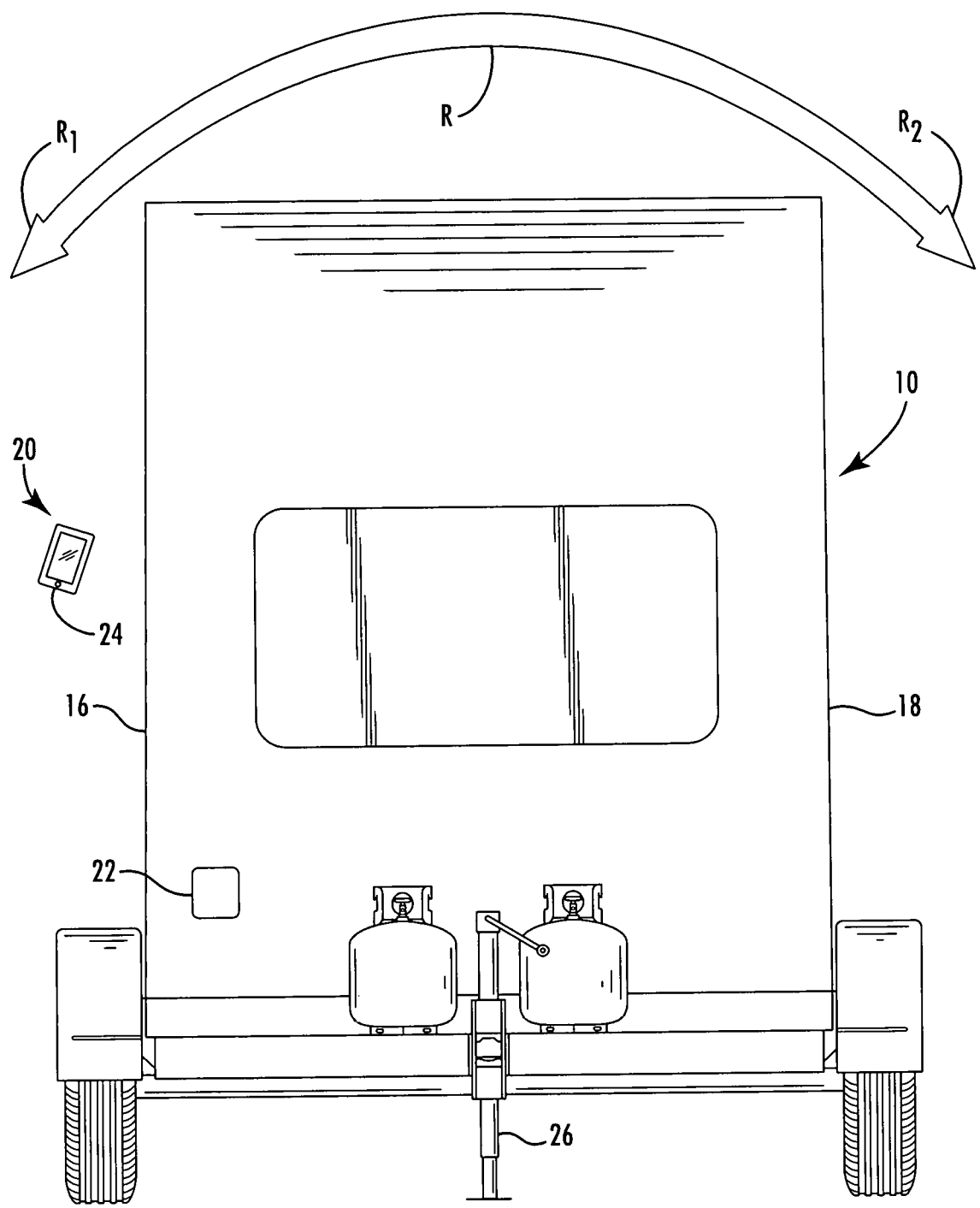
FIG. 2 illustrates a schematic front view of an embodiment of a vehicle that includes an embodiment of the leveling system according to FIG. 1.

As stated above, the devices, systems, methods and computer program products relate to leveling an RV relative to the two main axes of the RV (side-to-side and front-to-back). As used herein to describe the proposed leveling method and shown in FIGS. 1 and 2, pitch is defined as the angle of the RV from front to back and roll will be defined as the angle of the RV from side to side. As shown in FIG. 1, when adjusting the pitch, an embodiment of an RV 10 can be adjusted in pitch rotational directions P depend on the inclination of the RV from front-to-back. For example, if the RV 10 is inclined forward so that a rear section 12 is above a front section 14 proximal to a jack 26 of the RV 10, then the pitch of RV 10 can be adjusted in the direction of arrow point $P_1$. If the RV 10 is inclined backward so that the front section 14 is above the rear section 12, then the pitch can be adjusted in the direction of arrow point $P_2$. Similarly, as shown in FIG. 2, when adjusting the roll, the RV 10 can be adjusted in roll rotational directions R depending on the inclination of the RV from side-to-side. For example, if the RV 10 is inclined forward so that a first side section 16 of the RV 10 is above a second side section 18 of the RV 10, then the roll of RV 10 can be adjusted in the direction of arrow point $R_1$. If the RV 10 is inclined backward so that the second side section 14 is above the first side section 16, then the pitch can be adjusted in the direction of arrow point $R_2$.

To accomplish the adjustments so that, upon parking the RV 10, the RV 10 will be leveled in both the pitch and roll directions, a leveling system 20 can be provided that provides measurements to determine the amount of adjustment needed in both the pitch and roll directions. For example, the leveling system 20 can compose one or more sensor devices 22, which can comprise a vehicle leveling device, (shown schematically as a box) that can be secured to the RV 10 to sense the inclination and/or orientation of the RV 10 in both the pitch and roll directions. Additionally the leveling system 20 can also comprise a smart device 24 that can be in communication with the sensor device 22. For example, the smart device 24 can have a specific software application thereon that allows information received from the sensor device 22 about the inclination and/or orientation of the RV 10 to be processed to provide measurements to a user and to determine the amount of adjustments needed to the RV 10. The smart device 24 and the sensor device can communicate with each other in a variety of ways. For example, in some embodiments, the sensor device 22 and smart device 24 can communicate through a wired connection. In some embodiments, as shown in FIGS. 1 and 2, the sensor device 22 and smart device 24 can communicate through wireless communications, such as Bluetooth.

As noted above, the sensor device 22 of the RV leveling system 20 is shown schematically, and while it is shown on the exterior front section of the RV 10, it is noted that the sensor device can located at a variety of location and positions of the RV 10. For example, the sensor device 22 can be on the rear, sides or at a central location of the RV 10. Additionally, the sensor device 22 can be on the exterior, interior or inside the framework of the RV 10. As noted above, the mobile smart device software application may have a screen designed to define the installed orientation of the sensor device so that data from the appropriate axes can be used for pitch and roll calculations. The sensor device 22 can comprise a printed circuit board ("PCB") that can include various digital sensors including one or more digital accelerometers, one or more digital gyroscopes, a global positioning system ("GPS") sensor, and other sensors required for accomplishing the desired functionality of the RV leveling system. For example a digital temperature sensor may also be included that can be used to collect temperature data. For instance, the temperature data collected by the digital temperature sensor can be used to correct variations or irregularities in the data obtained by the sensor device 22. The PCB can also include a processor and stored software, such as firmware, to allow for the processing of data and performing calculations related to the desired functionality of the RV leveling system. The PCB can also include the components for Bluetooth or other wireless communication. The PCB can be battery powered or use other means of power such as AC or DC connections. The sensor device 22 can also comprise a housing or enclosure in which the PCB can be mounted for protection from damage and the environment.

For example, in some embodiments, the PCB of the sensor device 22 can have digital accelerometer that uses multiple axes, for example, an X-axis, a Y-axis and a Z-axis that are used to determine movement and position. When installing the sensor device 22 or after installation, whether on the front, the rear, sides or at a central location of the RV 10, one of the axes of the accelerometer can be assigned to measure the pitch P and another of the axes can be assigned to measure the roll R. For instance, the orientation of the sensor device 22 relative to the front, the rear, passenger side or drive side upon or after installation can be noted using the software application on either the PCB of sensor device 22 or the smart device 24 so that an appropriate axis can be assigned to determine the pitch angle measurement and an appropriate axis can be assigned to determine the roll angle measurement. In this manner, the orientation of the sensor device 22 can be identified or assigned relative to the vehicle. The mobile smart device 24 software application may have a screen designed to define the installed orientation of the sensor device 22 so that data from the appropriate axes can be used for pitch and roll calculations.

After the firmware is installed, each PCB, which can include a gyroscope or an accelerometer as described above, can be provided with power, for example, by securing the PCB into a fixture or installing the battery in the PCB, and then subjected to a temperature calibration process. The PCB's can then be placed in a stationary position in an environmental chamber. Such an environmental chamber can expose the PCB to a broad range of temperatures, such as typical temperatures find during use. For example, the environmental chamber can be a freezer that exposes the PCB therein to low temperatures. One reason this action is done is to determine variances in, for example, the measurements obtained from the gyroscope or accelerometer included in the respective PCB. Since the PCB's are stationary position when placed in these environmental chambers, the accelerometer data or gyroscope data should not change but, for example, the accelerometer data or gyroscope data does due to temperature change. The changes in such can be monitored by the firmware on PCB to determine how to compensate for the discrepancy in the accelerometer data or gyroscope data to maintain the level of accuracy of the data readings at different temperatures.

For example for PCB's that include accelerometers, each PCB is soldered slightly differently and each accelerometer is manufactured with slight differences. For such reasons, each PCB can undergo this temperature calibration process to achieve more accuracy and repeatability. During this process while the PCB is held in a stationary position, the firmware monitors the accelerometer data. When the firmware detects a change in the accelerometer data, a temperature sensor on the PCB is read by the firmware and the accelerometer count (angle) deviation that has occurred is recorded along with the temperature in a temperature calibration lookup table by the firmware. After the PCB has been subjected to a range of temperatures and the firmware has recorded all the accelerometer count (angle) deviation in this temperature calibration lookup table, the temperature calibration process is complete. The resulting temperature calibration lookup table can be used each time accelerometer data is used for calculations in the regular use of the sensor device, i.e., the vehicle leveling device, and the vehicle leveling system. So when the vehicle leveling system is in use, accelerometer data is read along with the current temperature from the sensor device. The firmware on the PCB then looks up that temperature in the temperature calibration lookup table. Any angle deviation at that temperature in the temperature calibration lookup table is read and used to correct the current accelerometer angle data. This temperature corrected accelerometer data then used to calculate the height requirements need to level the vehicle for that reading. As stated above, a similar temperature calibration process can be performed for gyroscopes to create a temperature calibration lookup table for gyroscope data.

In some embodiments, the smart device 24 can have a compatible wireless communication capability such as Bluetooth or other wireless communication protocol to obtain and/or share information from the PCB of the sensor device 22. The smart device 24 can comprise software that is capable of communicating with the PCB of the sensor device 22, storing information obtained from the PCB of the sensor device 22, manipulating the information obtained from the PCB of the sensor device 22 and/or user input related to the inclination and/or orientation of the RV 10, and displaying of information obtained from the PCB of the sensor device 22 and user input as well as information generated from the information obtained from the PCB of the sensor device 22 and/or the user input related to the inclination and/or orientation of the RV 10. In some embodiments, the sensor device 22 can comprise a memory in communication with the processor of the PCB and can be used to store information transmitted from the mobile smart device 24. In some embodiments, the sensor device 22 can use sensor data and/or stored user data to perform calculations on the sensor device 22 and transmit the calculated data to the mobile smart device 24 for further calculation or display or both. In the some embodiments, the smart device 24 can be a smartphone capable of storing and executing software applications. These calculations can be based off of the determination of the pitch and roll angles using the calibration data to determine the pitch angle measurements and the roll angle measurements. These calculations can include geometric calculations that can convert changes in angles to distance of movement need to obtain a level position of the vehicle in both the roll direction and the pitch direction based on the length and width of the vehicle being leveled. Such geometric calculations can be based on common geometric formulas that would be understood by those skilled in the art.

Figure 3:
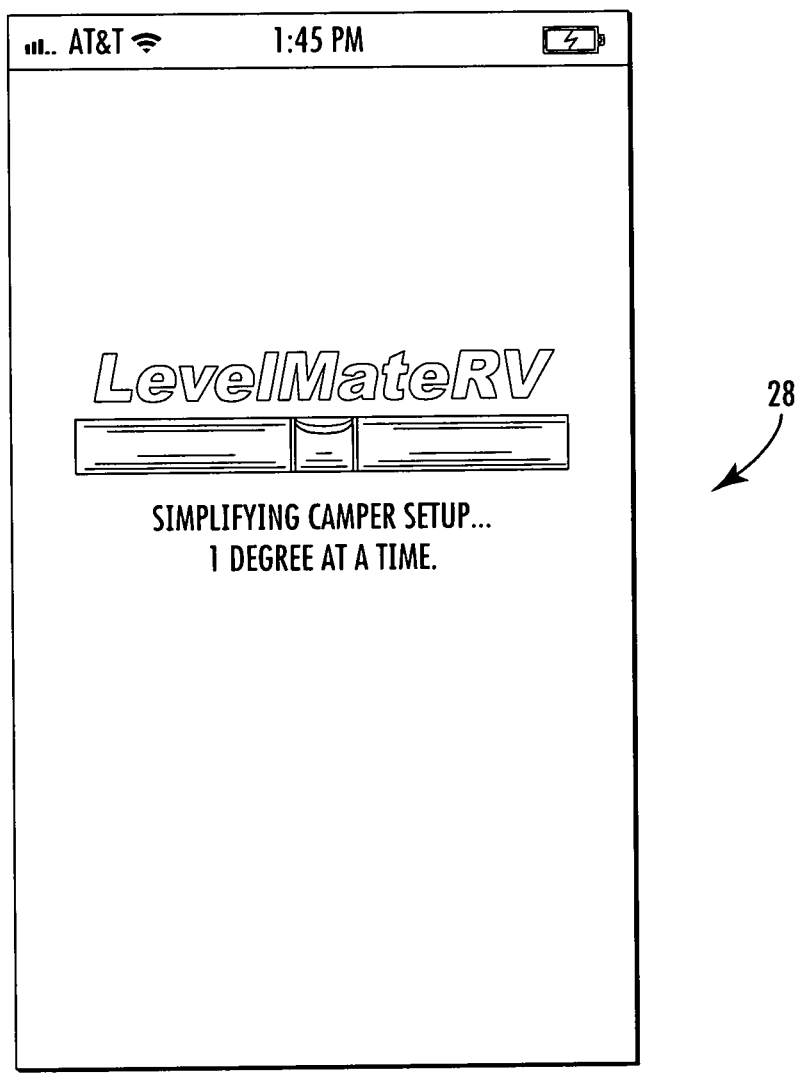
FIG. 3 illustrates a screen shot of an embodiment of a software application on a smart device for use in an embodiment of the leveling system according to the present subject matter.
Figure 4:
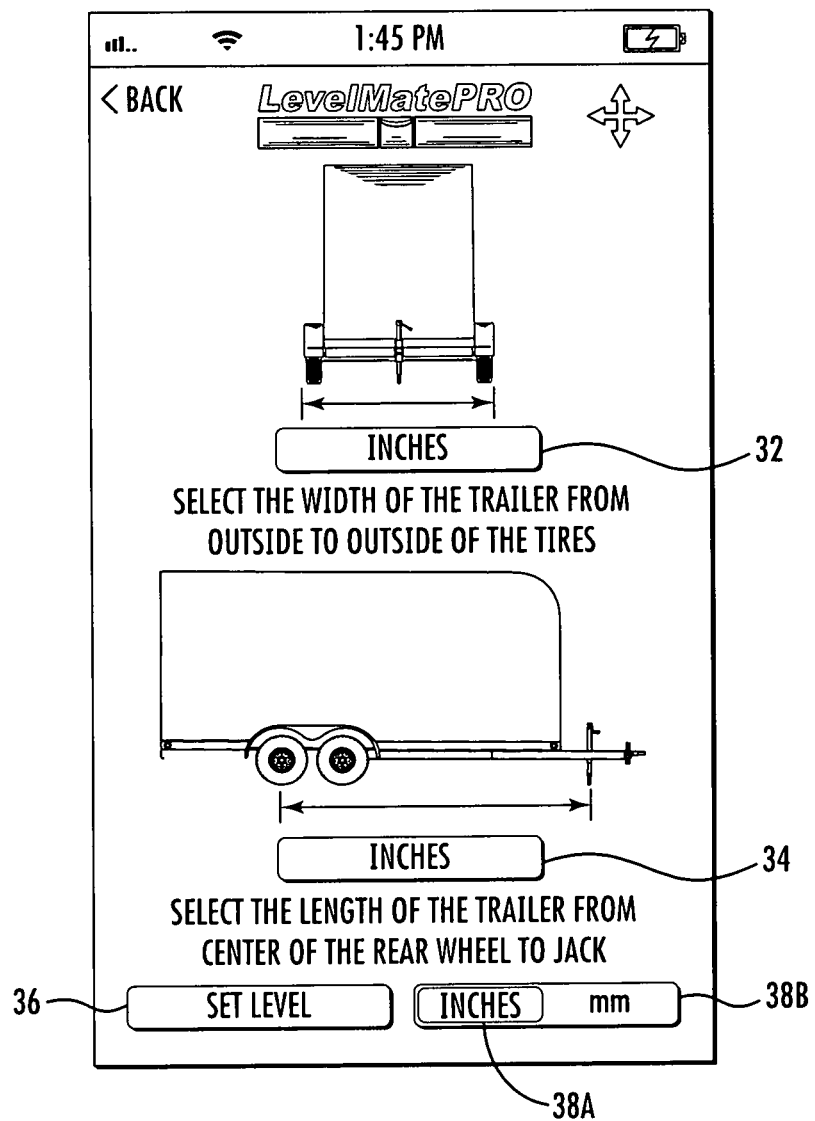
FIG. 4 illustrates another screen shot of an embodiment of a software application on a smart device for use in an embodiment of the leveling system according to the present subject matter.

FIGS. 3-6 illustrate embodiments of graphical user interface screens of an embodiment of a software application that can be used on the smart device 24. FIG. 3 illustrates a screen 28 of an entry or beginning screen through which a user can enter the software application, which can be used in some embodiments of the software application. In some embodiments of the software application, an entry screen may not be used. As shown in FIG. 4, the software application can have the ability to accept user input relating to the RV 10. For example, the software application can prompt the user to enter information such as the measurements of the RV 10, for example, the length and the width of the RV 10, that can be used to correctly calibrate the amount of adjustment needed in the pitch and roll directions. For example, as shown in FIG. 4, the software application as shown in a screen 30 can be provide an entry cell 32 for entry of a width of the RV 10 as measured from the outside of a first wheel, or tire, on a first side of the RV 10 to the outside of a second wheel, or tire, on a second side of the RV 10 along an axle of the RV 10. The screen 30 can also provide an entry cell 34 for entry of a length of the RV 10 as measured from a center point of the rear axle to the jack 26 at the front of the RV 10. The software application can store this information for use in calculating displayed information at the time of entry or at a later time. In some embodiments, the software application can save the entered information for recall at a later time as needed. In some embodiments, this information can be stored on the RV sensor device 22 after transmission from the smart device 24. In some embodiments, the software application can individually save information on multiple RV's that can be recalled at a later time as needed.

Figure 6:
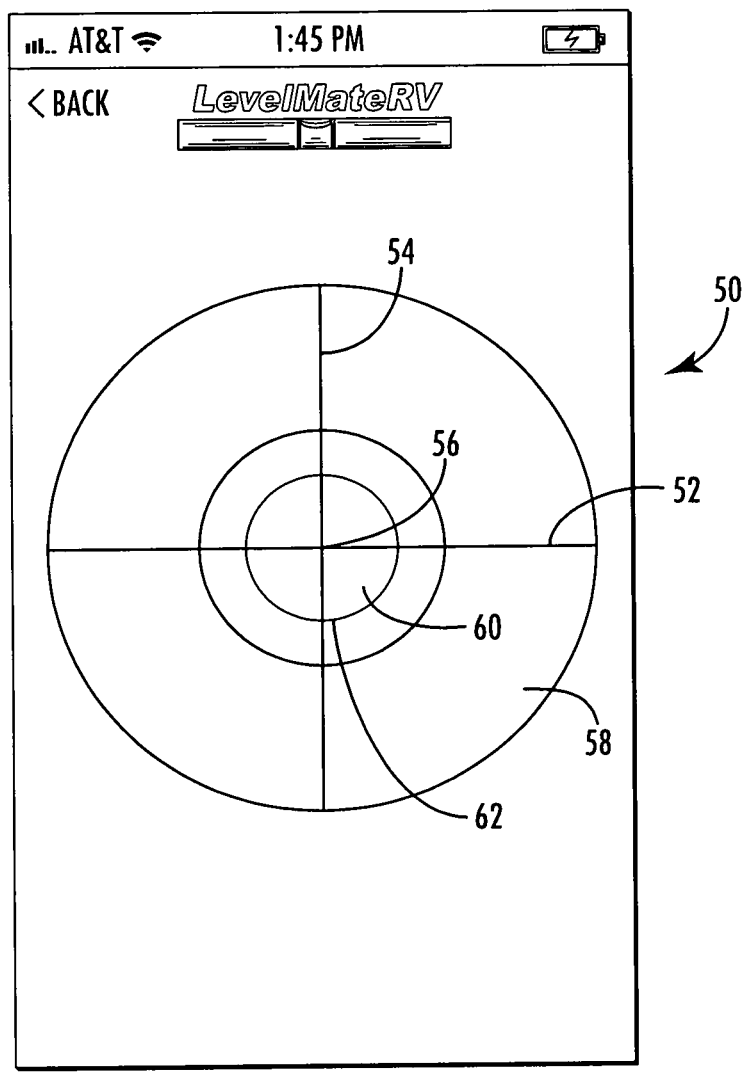
FIG. 6 illustrates a further screen shot of an embodiment of a software application on a smart device for use in an embodiment of the leveling system according to the present subject matter.

To begin, an initial level position can be determined for the RV to help determine any inconsistencies inherent in the leveling system, such as inconsistencies due to the installation or placement of the sensor device on the RV that may cause the sensor readings to be slightly off. The smart device 24 can be used to determine the initial level position using the accelerometer, gyroscope and/or GPS functions therein through a portion of the software application, or a different software application, as shown in FIG. 6 and described in more detail below. A typical digital or spirit level can also be used to achieve this initial level position. The smart device 24 can then capture, i.e., save and store the current pitch and roll angle measurements from the sensor device 22. These measurements will be used as offsets from the initial level position when displaying angles or calculating and displaying adjustment values necessary to move the RV back to the initial level position. Thus, the software application can determine if the measurements from sensor device 22 are slightly off when the RV is at the initial level position and then take those inconsistencies into consideration when taking measurement readings in the future.

In particular, the software application on the smart device 24 can have a calibration function as represented by a "Set Level" button 36 in the screen 30 for the initial set up of the software application. The "Set Level" button 36 can be used to obtain the current sensor readings in the roll and pitch directions from the sensor device 22 when the smart device 24 indicates that the vehicle is in an initial level position. These sensor readings when the RV 10 is at the initial position may be stored as calibration data on the smart device 24 or the sensor device 22 or both. This calibration data can be used to compensate for any imperfections in the sensor readings that may derive from the installation and/or placement of the sensor device 22 on the vehicle 10. Once this calibration function is completed, it does not necessarily need to be performed again. Additionally, in some embodiments as shown in FIG. 4, the software application can have a conversion function as represented by the "inches" and "mm" buttons 38A, 38B in the screen 30. These buttons 38A, 38B can be used to set and/or change the metrics system used to measure, calibrate, and compute. For example, as shown, the system used for measurements can be set and/or changed between U.S. Customary System ("inches") and the Metric System ("mm").

Once the calibration has been performed, the software application can be used determine the change in roll and the change in pitch needed for the given RV 10 based on measurements from the sensor device 22 at any given location. In some embodiments, the sensor device 22 may use the calibration data as well as other current sensor data, such as the current pitch angle and roll angle measurements and temperature readings from the sensor device 22 or a another temperature sensor device, and perform calculations, such as an accurate calculation of the current angle of the vehicle and the offset that is needed, using the processor and firmware on the PCB of the sensor device 22. In some embodiments, a user can activate the software application to initiate the measurements to determine the change in roll and pitch by simply opening the software application on the smart device 24 when connected to a wire communication with the sensor device 22 or within range of the sensor device 22 for a wireless communication connection, depending on how communication is setup between the smart device 24 and the sensor device 22. In some embodiments, the software application can display an interface on a display screen, such as a button, once the software application is opened that can be activated to initiate this determination, or calculation, function.

Figure 5A:
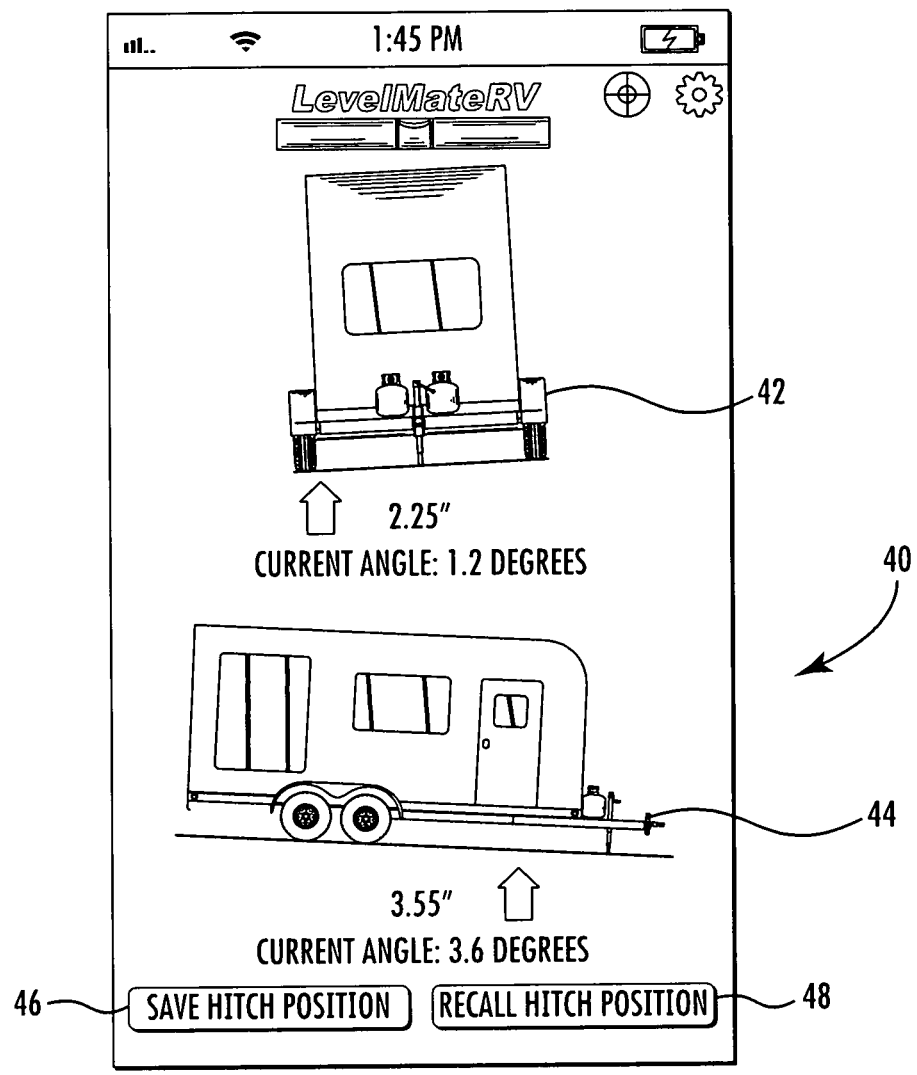
FIGS. 5A and 5B illustrate possible additional screen shots of an embodiment of a software application on a smart device for use in an embodiment of the leveling system according to the present subject matter.
Figure 5B:
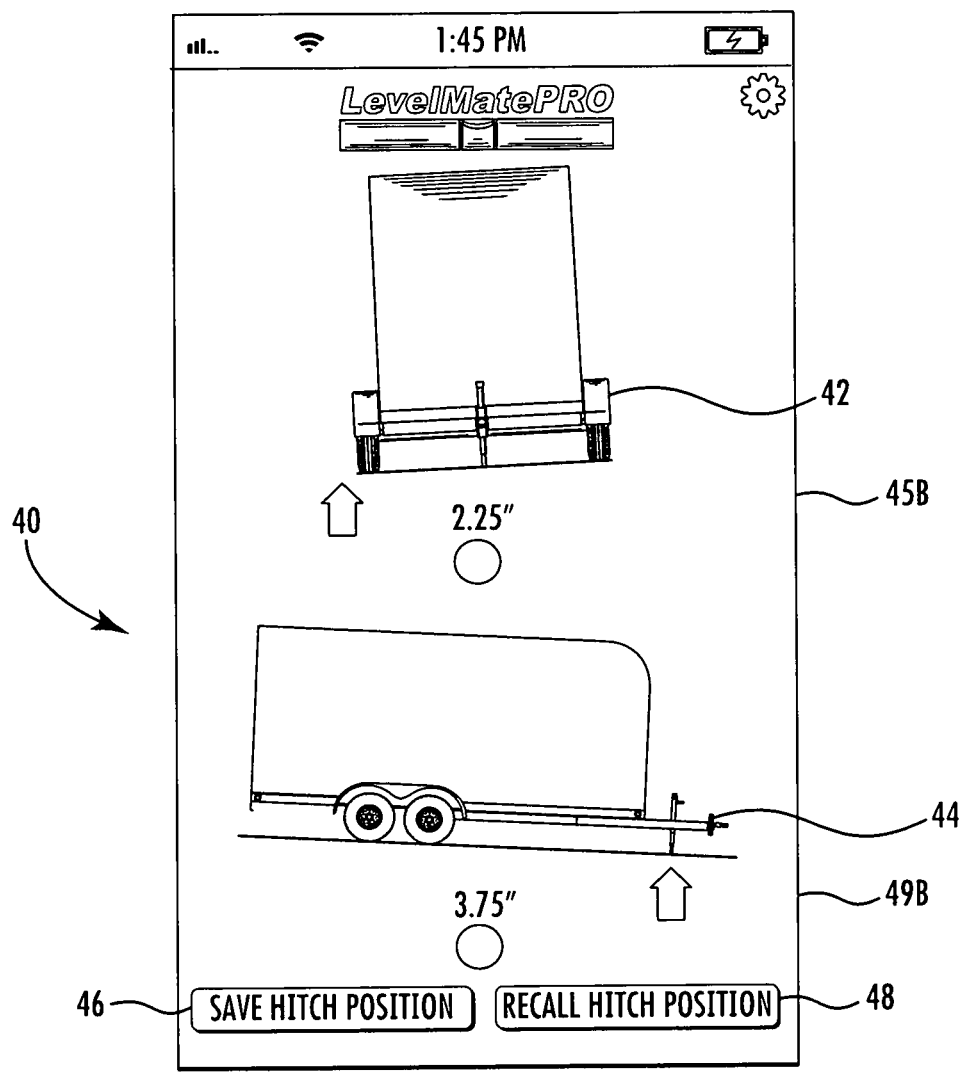

FIGS. 5A and 5B show similar screen shots of information that can be displayed in real time or near real time. Once the determination/calculation function is initiated and the change in roll and pitch calculated by the software application or the processor and firmware on the PCB of the sensor device 22, the determined change in roll and pitch can then be displayed as shown in a screen shot 40 in FIGS. 5A and 5B. For example, a roll display 42 can be given as shown in FIGS. 5A and 5B. Similarly, a pitch display 44 can be provided. As shown in FIG. 5A, in some embodiments, the roll display 42 can provide, for example, the current angle from level for the roll directions measured in degrees 43A and the amount of elevation change 45A in inches or millimeters needed on a given side to level the RV in the roll direction. Alternatively, in some embodiments as shown in FIG. 5B, the roll display 42 can provide, for example, the current angle from level for the roll directions measured or expressed as the amount of elevational change 45B in inches or millimeters needed on a given side to level the RV in the roll direction. Similarly, as shown in FIG. 5A, in some embodiments, the pitch display 44 can, for example, provide the current angle from level for the pitch directions measured in degrees 47A and the amount of elevation change 49A in inches or millimeters needed on either the front or the back to level the RV in the pitch direction. Alternatively, in some embodiments as shown in FIG. 5B, the pitch display 44 can, for example, provide the current angle from level for the pitch directions as measured or expressed in the amount of elevation change 49B in inches or millimeters needed on either the front or the back to level the RV in the pitch direction.

The software application on the smart device 24 can provide the ability for the user to configure the display resolution to specific height increments for adjustment of. Typically, accelerometer data, even though digitally filtered, can be choppy and cause the display of the calculated height to change between the set filter levels, i.e., the display resolution, for the digital filter that are to be displayed based on the calculations. In some situations, when the display resolution is set to smaller increments, for example, of 0.25 inches, the display of the expected height change can move back and forth between the closest two increments or flicker back and forth between the increments. For example, the display of the calculated height can flicker between 0 inches and 0.25 inches if the native resolution of the digital filter within the sensor device or vehicle leveling device, is 0.25 inches and the calculated height is a measurement between 0 inches and 0.25 inches.

Typically, RV users use plastic blocks or wooden dimensional lumber as adjustment blocks to drive the RV 10 up on to get to the height required to reach a level position. Typically, these adjustment blocks are of a regular thickness, if the adjustment blocks being used, for example, are all one (1) inch thick then the accuracy of getting to a level position is going to be determined based on this set block thickness, meaning that the change in elevation of height will be in one (1) inch increments. Thus, the software application can include a screen that will allow the input of an increment of resolution by which the digital filter will operate for providing an adjustment of height in the elevation run direction and the pitch direction. For example, if the RV users have one (1) inch blocks, in some embodiments, the user can provide a display resolution can be selected from a menu of a variety of different display resolutions that can match the height of adjustment provided by the adjustment blocks the RV user may have. In some embodiments, the software application can provide a screen in which the RV user can enter the increment of display resolution for the leveling system to use. Thereby the leveling system and methods provided herein can provide the ability of the RV user to select different display resolutions. Thus as explained in the example above, the RV user can select the display resolution of one (1) inch and the smart device running the software application would only show calculated heights in one (1) inch increments. By increasing the value of the display resolution, the RV user can obtain more useful information for the obtaining the adjustment in height that they need and the display based on the larger increment of the display resolution can be much more stable and less likely to flicker between incremental numbers due to the wider threshold of rounding in the math. For example, in some embodiments, the display resolution can be set during a configuration or installation of the sensor device.

As the current roll angle changes, the roll angle measurements expressed in degrees 43A and/or the amount of elevation change 45A, 45B will change. As the current pitch angle changes, the pitch angle measurements expressed in degrees 47A and/or the amount of elevational change 49A, 49B will also change. More particularly, for example, for the change in pitch, the amount of elevation change can be affected by the moving of the jack 26 proximal the front section 14 up or down by the requisite distance displayed. The changes in current roll and pitch angles can also be shown in in the graphic image of the vehicle as shown in displays 42 and 44 in real time or near real time.

As shown in the screen 40 in FIGS. 5A and 5B, the mobile smart device software application can also provide the ability to save a given pitch angle, either on the smart device 24 or on the sensor device 22, for the purpose of returning to that position at a later time as illustrated by the "save hitch position" button 46 in screen 40. To reuse the pitch angle that had been saved, a recall can be provided, such as recall button 48. This functionality can be useful for travel trailers and fifth wheel RV's that must be detached from a tow vehicle when in use. The pitch angle saved when the tow vehicle is detached from the RV will be recalled for pitch angle positioning when reattaching the tow vehicle. This will simplify and increase the speed of reattaching the tow vehicle to the RV.

As mentioned above and described in more detail below, in some embodiments, once the sensor device 22 has been properly mounted to the inside or outside of the RV 10, the RV 10 can be leveled to an initial level position using the typical method described above or by placing the smart device 24 on the floor or some other horizontal surface of the RV and using a digital level software application, either separate from or integrated into the software application. FIG. 6 shows a screen 50, for example, of the software application that can be used to measure both the pitch and the roll angles using a pitch measuring line 52 and a roll measuring line 54 forming a crosshair 56. The software application on the smart device 24 can show a display that operates in a similar manner to a spirit level so as to display movement of the pitch and roll angles toward a center bull's eye 60 as the smart device on the horizontal surface is moved toward a leveled position. The progress toward the bull's eye 60 can be measured by the position of the crosshair 56 relative to the area 58 surrounding the bull's eye 60 as the crosshair 56 approaches the demarcation line 62 as the horizontal surface is moved closer to the leveled position. In this manner, the smart device 24 can be used in this initial leveling to determine an initial level position. As mentioned above, a typical digital or spirit level could also be used to achieve this initial level position. The smart device 24 can then capture, i.e., save and store the current pitch and roll angle measurements from the sensor device 22 or cause (by a transmitted instruction from the smart device 24) the sensor device 22 to save and store the calibration data of pitch and roll angle measurements on the sensor device 22. This calibration data will be used as offsets from the initial level position when displaying angles or calculating and displaying adjustment values necessary to move the RV back to the initial level position.

Once measurements are generated using the set level button 36 that relate to the initial level position of the RV, these measurements can be stored on the smart device 24, or stored in a memory storage location on the PCB sensor device 22 and recalled to the smart device 24 at a desired time. The smart device 24 with the software application running can then be used to calculate and display angles relative to the initial level position and to calculate and display adjustment values necessary to move the RV to the initial level position when the RV is moved to a location for use. In some embodiments, the calculation of angles relative to the initial level position can be performed by the processor and firmware on the PCB of the sensor device 22. Performing the calibration function on the software application, the smart device 24 can wirelessly connect (or, in some embodiments, connect through a wired connection) to the sensor device 22 and request the current angle measurements for pitch and roll. These measurements can be stored on the smart device 24, or stored in a memory storage location on the PCB sensor device 22 and recalled to the smart device 24 at a desired time, for use in calculating displayed information in the subsequent screens such as screen 40 shown in FIG. 5 with the roll display 42 and the pitch display 44 as explained below. These stored measurements can be used as offsets from the initial level position based on the angle indications calculated from the various sensors of the sensor device 22. This is required to establish the relationship between the position of the mounted sensor device 22 and the initial level position in both pitch and roll as measured and/or captured by the smart device 24 or the sensor device 22 as described above.

In some embodiments, if the RV level system is installed during the manufacturing of the RV, then the RV level system can be calibrated at the factory eliminating the need for the user to do it. In such embodiments, the calibration function can be skipped by the user.

In subsequent displays 42, 44 of the current angles relative to the initial level position on the software application on the smart device 24 as shown in the screen 40 in FIG. 5, for example, these stored calibration data measurements will be added or subtracted from the actual calculated sensor data from the PCB of the sensor device 22 to determine the actual angle relative to the initial level position accounting for the actual mounted orientation of the sensor device 22. In some embodiments, the displays 42, 44 can show an image of the vehicle that reflects the actual position of the RV 10 with the actual angles in the respective pitch and roll directions of the RV 10 such that the image of the vehicle moves as the angles in the respective pitch and roll directions of the RV 10 change. Once accurate angle measurements have been calculated and displayed in the screen 40 of the software application on the smart device 24, additional calculations regarding the added height needed to achieve the initial level position of the RV can be performed either by the software application of the mobile smart device 24 or by the processor and firmware on the PCB of the sensor device 22. These calculations regarding the added height needed to achieve the initial level position of the RV can be displayed by the software application on the mobile smart device 24, for example, in the respective roll display 42 and pitch display 44 or on a different screen in other embodiments. The appropriate side or direction of added or removed height can also be displayed using arrows and/or the calculated height required as shown for example in the respective roll display 42 and pitch display 44 of screen 40 of the described example embodiment of software application. These calculations are achieved by using the stored information about the length and width of the RV 10 and the calculated current angle relative to the initial level position of the RV and using trigonometric formulas to calculate the height and location for the height addition or reduction to achieve a level position.

Figure 7A:
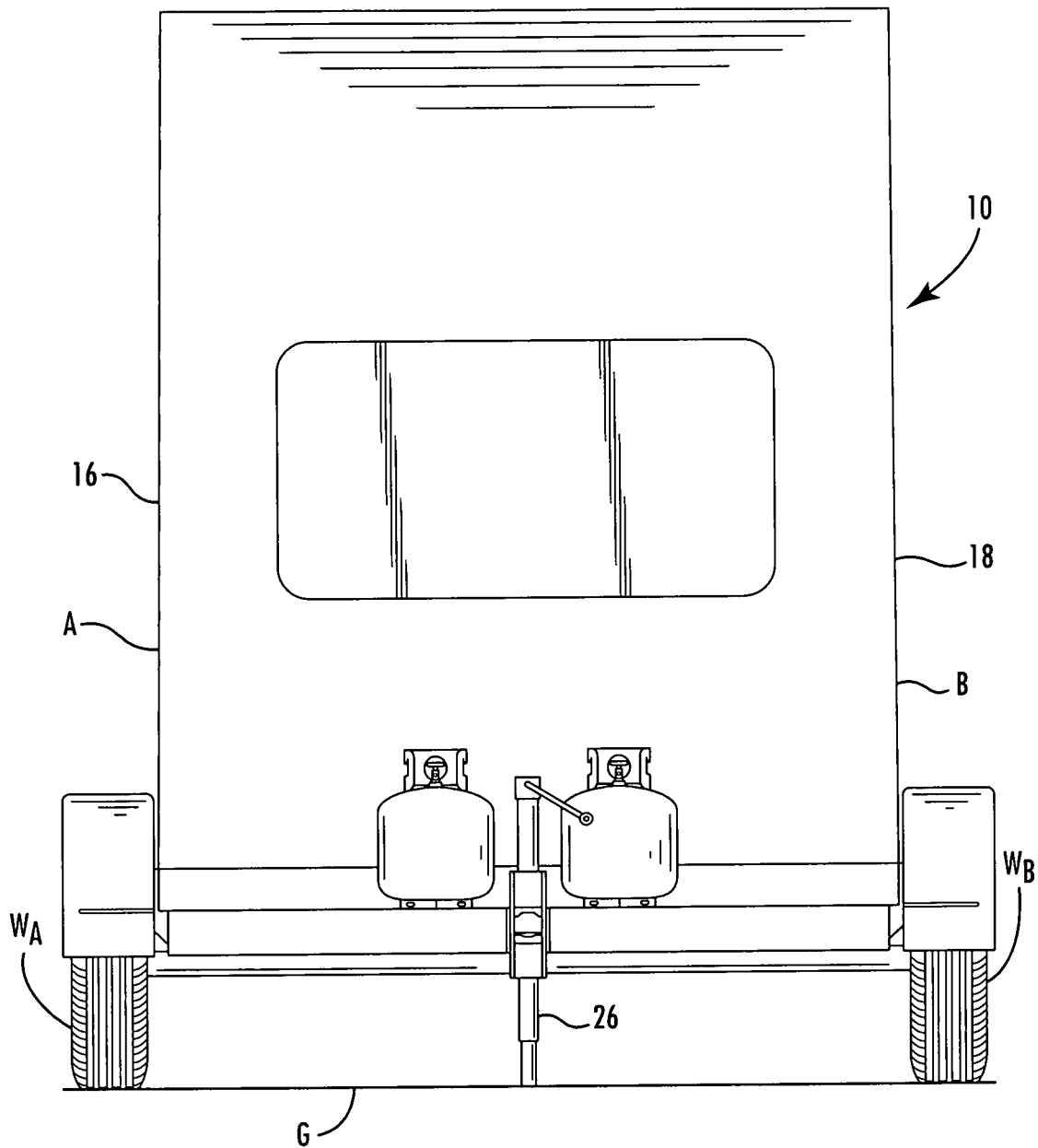
FIG. 7A illustrates a schematic front view of an embodiment of a recreational vehicle positioned at a desired location before leveling.
Figure 8A:
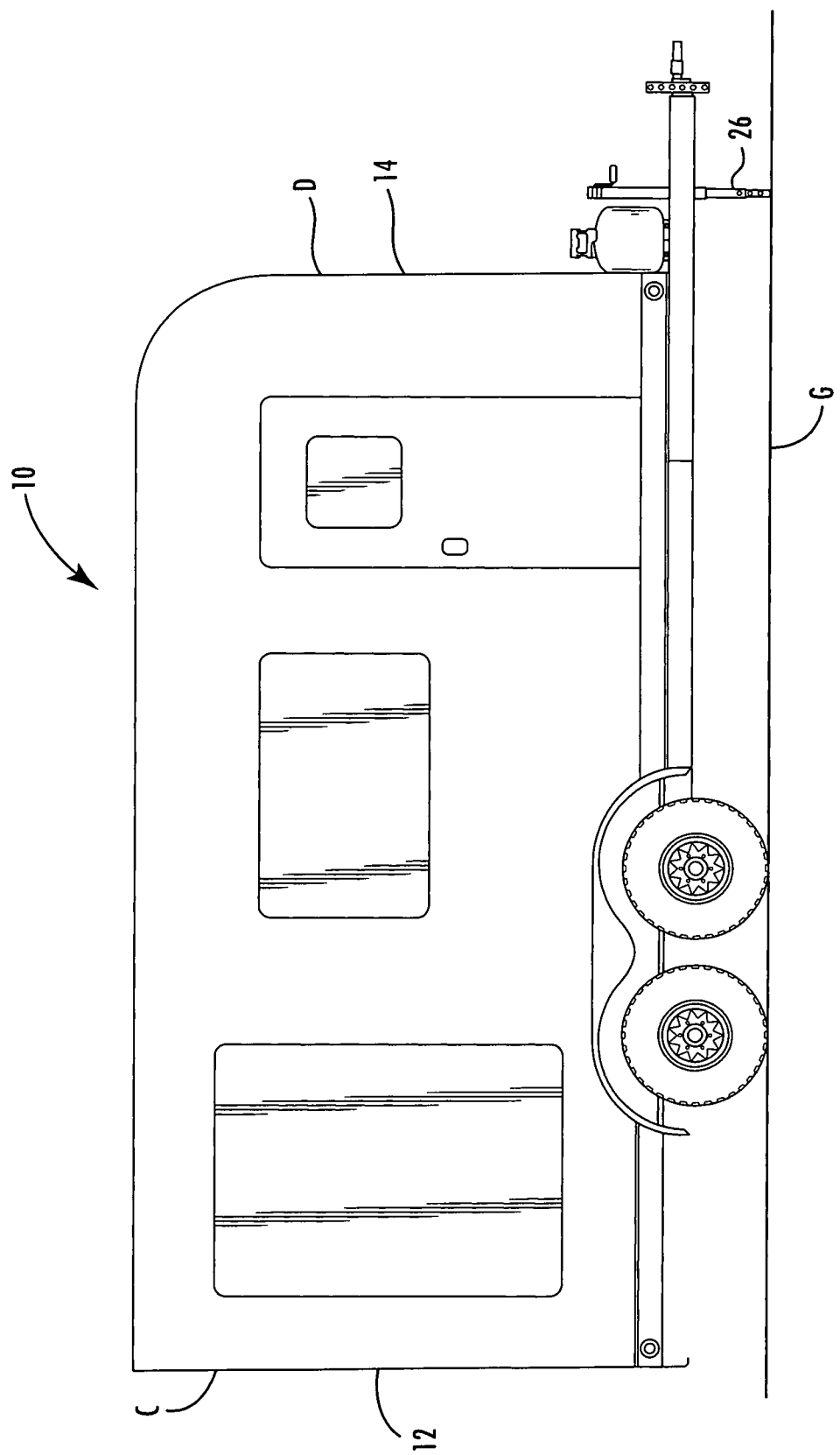
FIG. 8A illustrates a schematic side view of the embodiment of the recreational vehicle according to FIG. 7A positioned at a desired location before leveling.

For example, as shown in FIGS. 7A and 8A, an RV 10 can be parked, or positioned, at a desired location. A leveling system 20 on RV 10 (as shown in FIGS. 1 and 2) can be previously used to determine an initial level position that provides a true level measurement that has been stored on the smart device 24 of the leveling system 20, or stored in a memory storage location on the PCB sensor device 22, such as an RV leveling device, and recalled to the smart device 24, for later use. The RV 10 can have three or more structural supports, such as wheels $W_A$, $W_B$ and jack 26 on a ground G at the desired location. As shown in FIG. 7A, the RV 10 leans toward the first side A of RV 10 on first side section 16 at the desired location. Similarly, as shown in FIG. 8A, the RV 10 leans toward the front C of RV 10 on the front section 14 at the desired location. Thus, the RV 10 is not leveled at the desired location based on the structural supports current position on the ground G.

Figure 7B:
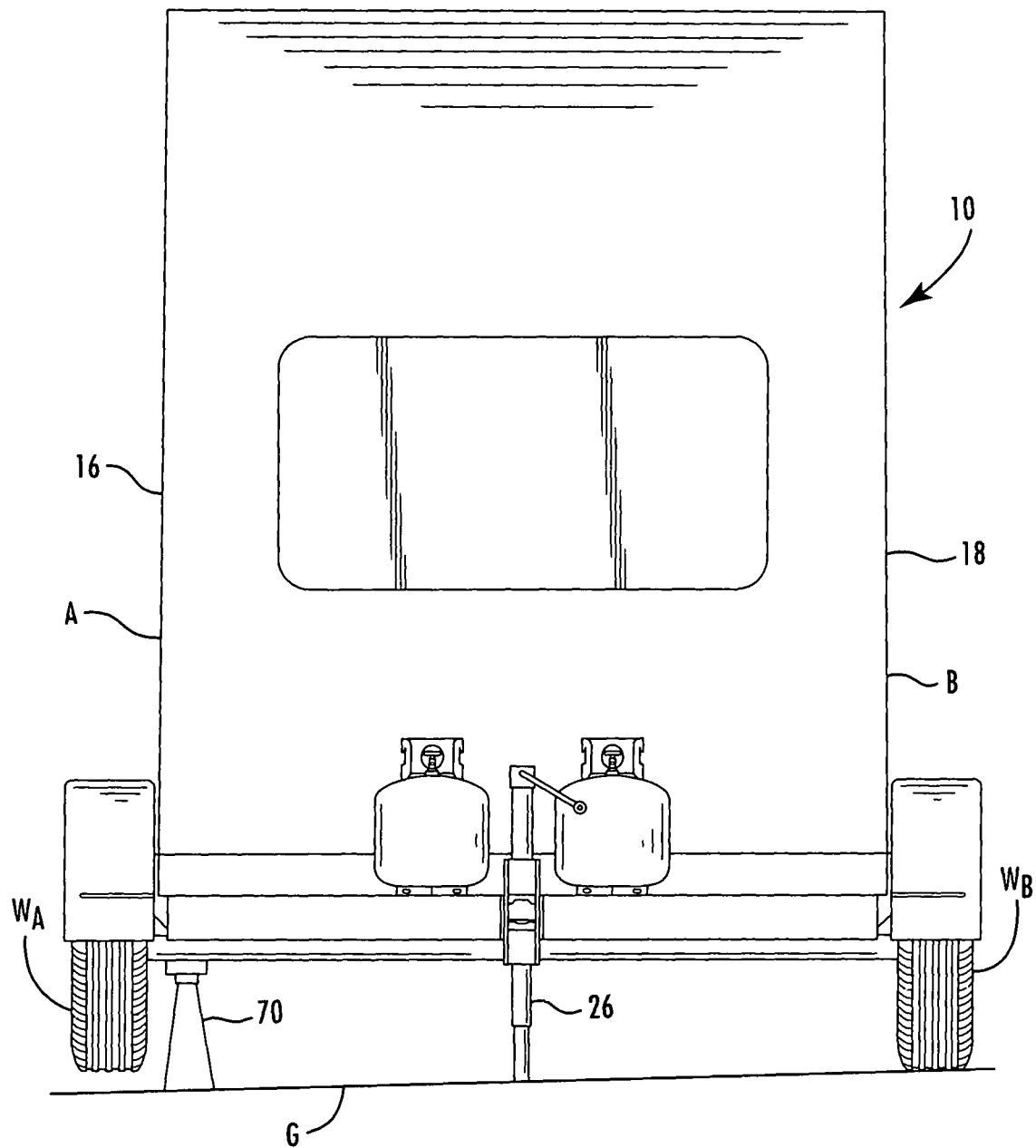
FIG. 7B illustrates a schematic front view of the embodiment of the recreational vehicle according to FIG. 7A positioned at a desired location after leveling in the roll direction according to the present subject matter.
Figure 8B:
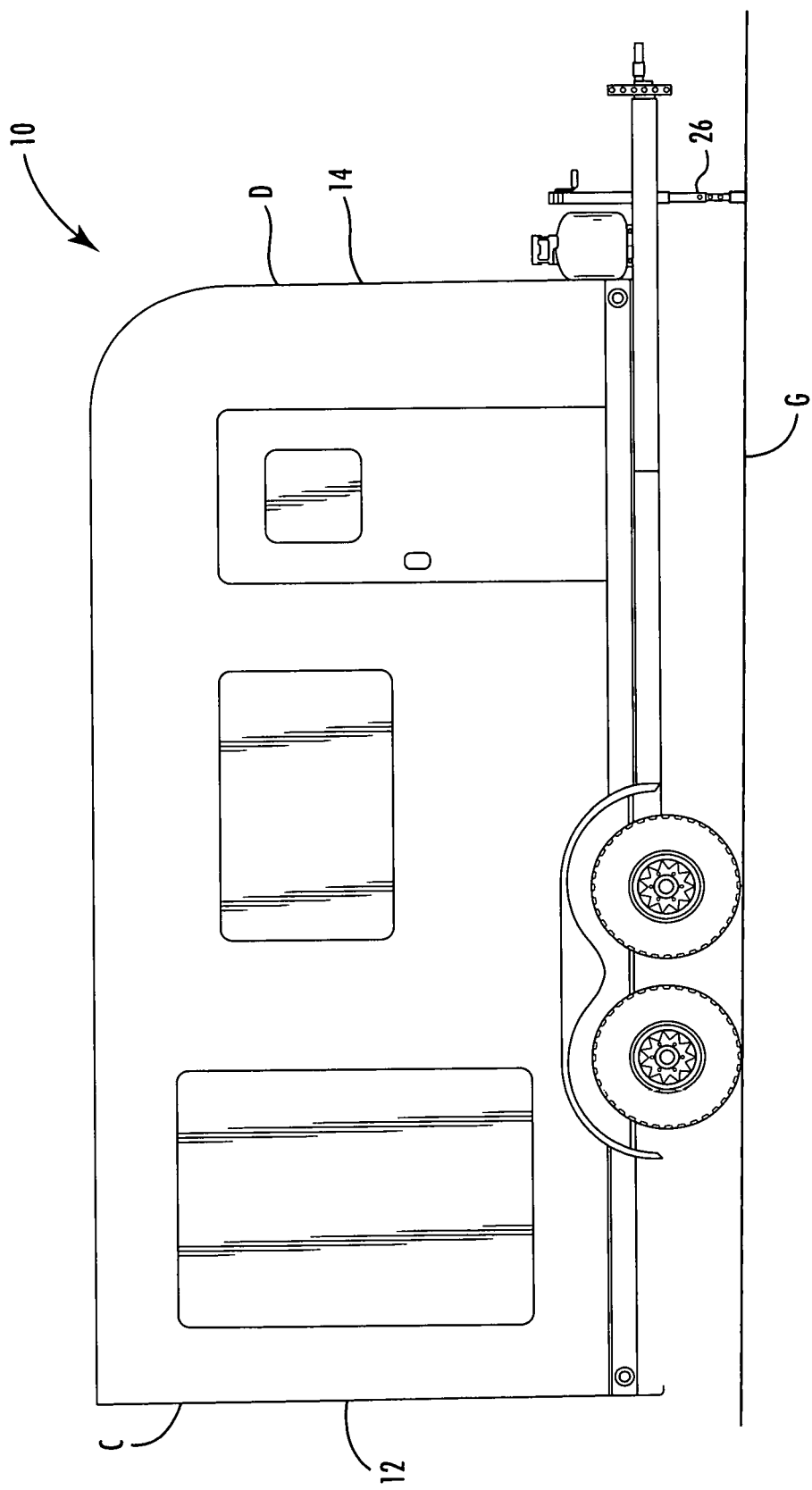
FIG. 8B illustrates a schematic side view of the embodiment of the recreational vehicle according to FIG. 7A positioned at a desired location after leveling in the pitch direction according to the present subject matter.

The software application on the smart device 24 of the leveling system can be accessed to initiate the determination of the needed change in the roll and pitch directions to level the RV 10 at the desired location. The smart device 24 can communicate with the sensor device 22 of the leveling system 20 to obtain sensor data used to determine the current angle measurements for the roll and pitch directions off from true level, i.e., the initial level position stored in the smart device. The needed angle change, distance change, and/or direction of change for the roll and pitch directions can be displayed on the smart device 24 as shown in the roll display 42 and pitch display 44 in screen 40 of the software application (see FIG. 5). As shown in FIG. 7B, the first side A of RV 10 can then be raised the needed amount so that the first side A and a second side B of the RV 10 can be level with one another in the roll direction based on the information provided in the roll display 42 (see FIG. 5). For example, a jack 70, or other mechanism can be used to raise the first side A of RV 10. Similarly, as shown in FIG. 8B, the front side C of RV 10 can be raised the needed amount so that the front side C and a rear side D of the RV 10 can be level with one another in the pitch direction based on the information provided in the pitch display 44 (see FIG. 5). For example, a jack 26 can raise the front side C of RV 10 the needed amount.

As another example, the software application on the smart device 24 or the software on sensor device 22 can calculate that an RV is 2 degrees out of level in the roll direction and height needing to be added to the left side of the RV. In this example, the stored width of the RV is 8 feet or 96 inches. Using a trigonometric function, the height needed to achieve a level position can be calculated as 3.3523 inches. Knowing exactly how much height is needed to reach a perfectly level position in both pitch and roll will simplify and reduce the amount of time required to level the RV. Both the software of the sensor device 22 and the smart device software application can dynamically and in near real time update and graphically display the current pitch and roll of the RV representations using a proportional algorithm.

Additionally, in some embodiments, the sensor device 22 can have sensors that are able to defect relative humidity, temperature and barometric pressure. For example, the PCB of the sensor device 22 may have sensors that are able to detect relative humidity, temperature and barometric pressure. The user may desire to mount the sensor device 22 on the exterior or interior of the RV depending on whether they are more interested in measuring the environmental conditions outside or inside the RV. This environmental information will also be wirelessly transmitted to the smart device 24 and displayed for the user.

In some embodiments as stated above, the mobile smart device software application that can be downloaded and run on the smart device 24 can permit input of the RV length and RV width for the purpose of calculating the amount of height needed at the appropriate piece to return the RV to a previously defined level position. In some embodiments, this length and width could be pre-programmed for venous makes and models of RV's, eliminating the need for the user to measure and input the length and width dimensions. Instead, the mobile smart device software application can have a screen that lists the make and model of the RV. In some embodiments, the lists of RV's can contain various information about the different makes and models of RV's including pictures and other information. The screen can allow the user to scroll the list or can provide a search mechanism that allows the user to find the exact RV in question or shorten the list of RV's to be viewed. In this manner, the user would simply select the make and model of the RV from a list contained within the mobile smart device software application of the smart device 24.

RV's typically have control panels that consist of pushbuttons and/or indicator LED's and/or LCD displays. These control panels are used to display data about the condition of various RV systems or to activate various RV systems. Typical data displayed by some RV control panels can include holding tank fluid levels and battery power levels. Typical RV systems that might be activated from some control panels would be power slideouts and starting or stopping the generator. In some embodiments, the smart device 24 can be integrated or in communication with the various RV control panels and systems either through wired or wireless communications. For example utilizing a wireless communication system or protocol, such as Bluetooth or WiFi, the mobile smart device software application on the smart device 24 can display the data that is generated and displayed on some of the RV control panels such as holding tank levels, battery power levels and the like. In addition, the mobile smart device software application can also be used to activate various RV systems such as power slideouts, starting the generator, stopping the generator, or the like. The mobile smart device software application could also be used to control more general RV systems such as lighting and entertainment systems. For example, the mobile smart device software application can generate screens that are displayed on the smart device 24 that display the data that is generated and displayed on some of the RV control panels. Additionally, the mobile smart device software application can generate screens that are displayed on the smart device 24 that provide user interfaces, such as buttons that can be used to activate various RV systems by the user, for example, remotely or wirelessly.

In some embodiments, the PCB of the sensor device 22 can contain a GPS sensor allowing the current physical location of a vehicle, such as RV 10, that the sensor device 22 has been mounted on to be transmitted to the mobile smart device 24 or saved and stored on the sensor device 22. Positional movements of the vehicle, along with date and time information, can be saved and stored on the mobile smart device 24 or the sensor device 22. This saved vehicle positional movement information along with saved and corresponding date and time information can be used to determine actual use information regarding the vehicle. For instance, this positional movement information can be used to make determinations on the actual times that the vehicle is used over a given time period, how many days the vehicle is typically used when it is away from the normal storage locations, how many miles the vehicle is typically driven or towed to each use locations, and other information that might be relevant to the manufacturer of the vehicle. Total distance traveled by the vehicle could also be saved and stored on the mobile smart device 24 or sensor device 22 for use by the manufacturer of the vehicle for warranty or other uses. The total number of miles traveled by a non-drivable vehicle such as a trailer or towable RV is not currently recorded in any other manner and this may be useful information for many purposes such as used value determination, tire warranties, and many others. This saved and stored vehicle location, date, time and usage information could be transmitted from the mobile smart device 24 via the internet to email or computer server addresses or locations designated by the vehicle manufacturer.

Figure 9:
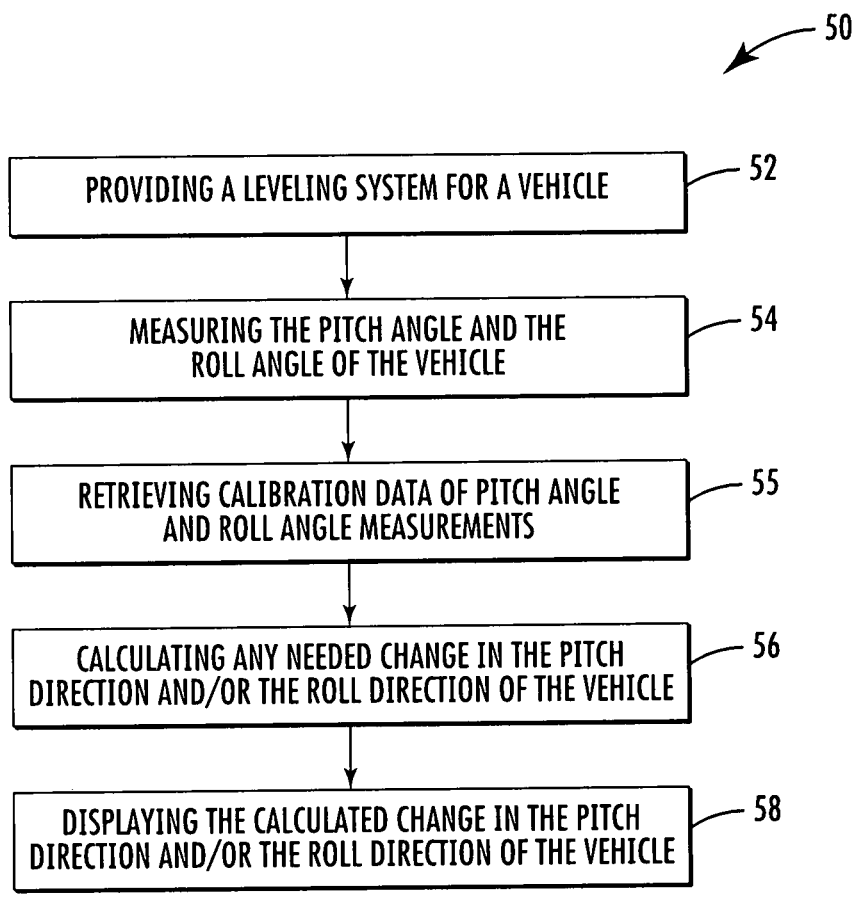
FIG. 9 illustrates an embodiment of a flowchart of a method of leveling a vehicle according to the present subject matter.

Thus, according to the disclosure herein, a method, generally designated 50, for leveling a vehicle, such as a recreational vehicle, can be provided as shown in FIG. 9. To begin, a leveling system can be provide that comprises one or more sensor devices, that can comprise one or more vehicle leveling devices secured to a vehicle to sense at least one of an inclination or an orientation of the vehicle in both a pitch direction and a roll direction and a smart device in communication with the one or more sensor devices as shown in step 52. The method can comprise a step 54 of measuring the pitch angle and the roll angle of the vehicle when the vehicle is at rest using the sensor device as shown as FIG. 9. To determine the needed movement of the vehicle to achieve a level position based on the measures of the pitch angle and the roll angle, calibration data of pitch angle and roll angle measurements taken by the sensor device when the vehicle was at an initial level position can then be retrieved as shown in step 55. The method 50 can additionally comprise a step 56 of calculating any needed change in at least one of the pitch direction or the roll direction of the vehicle using the measurements of the pitch angle and the roll angle of the at rest vehicle and the calibration data of pitch and roll angle measurements to obtain a level position of the vehicle. This calculation can be performed by the one or more sensor devices or the smart device. In step 58, the calculated change in at least one of the pitch direction or the roll direction of the vehicle can be displayed on the smart device.

In order to initially develop the calculation data, the method described above can also include the step of determining the initial level position for a vehicle to determine any inconsistencies inherent in the leveling system. Depending on the embodiment of the method, this determination step can be performed on the one or more sensor devices or the smart device. In some embodiments, the step of determining an initial level position can comprise receiving measurements of a length and a width of the vehicle. In some embodiments of the method, the step of determining an initial level position can comprise using at least one of an accelerometer, gyroscope, or global positioning system sensor on the smart device to achieve the initial level position. In some embodiments, the step of determining an initial level position can comprise using at least one of a digital level or spirit level can also be used to achieve the initial level position. In some embodiments of the method, the step of determining an initial level position can be performed by during manufacture of the vehicle and the calibration data stored on the sensor device installed during manufacture. In some embodiments, when installing the sensor device or after installation, whether on the front, the rear, sides or at a central location of the vehicle, an axis can of a plurality of axes of the accelerometer on the sensor device can be assigned to measure the pitch of the vehicle and another axis of the plurality axes of the accelerometer on the sensor device can be assigned to measure the roll of the vehicle. For instance, in some such embodiments, the orientation of the sensor device relative to the front, the rear, the passenger side or the drive side of the vehicle can be noted using the software application on either the sensor device or the smart device so that an appropriate axis can be assigned to determine the pitch angle measurement of the vehicle and an appropriate axis can be assigned to determine the roll angle measurement of the vehicle. The mobile smart device software application may have a screen designed to define the installed orientation of the sensor device so that data from the appropriate axes can be used for pitch and roll calculations. The pitch and roll angle measurements from the sensor device taken at the initial level position can then be captured, i.e., identified and stored or saved, to provide the calibration data of the pitch and roll angle measurements to permit consideration of any inconsistencies determined when taking measurement readings at a future time. For example, the calibration can be calculated and then saved on a sensor processor on the one or more sensor devices or saved on the smart device that is in communication with the one or more sensor devices. In some embodiments of the method, the step of capturing the pitch and roll angle measurements from the sensor device can comprise communicating calibration data from the sensor device of the pitch and roll angle measurements measured by the sensor device when the vehicle is at the initial level position to the smart device and saving the calibration data on the smart device. In some embodiments of the method, the step of capturing the pitch and roll angle measurements from the sensor device can comprise saving the calibration data of the pitch and roll angle measurements measured by the sensor device when the vehicle is at the initial level position on the sensor device. In some such embodiments where the calibration data is saved on the sensor device, the step of saving the calibration data of the pitch and roll angle measurements on the sensor device can comprise transmitting instructions from the smart device to the sensor device to save and store the calibration data of the pitch and roll angle measurements on the sensor device. In some such embodiments, the method can include recalling the calibration data of the pitch and roll angle measurements from the sensor device to the smart device.

In some embodiments of the method, the step 58 of displaying the calculated change in at least one of the pitch direction or the roll direction of the vehicle can comprise displaying the calculated change in the pitch direction and the roll direction of the vehicle in measurements of distance. In some embodiments of the method, the step 58 of displaying the calculated change in at least one of the pitch direction or the roll direction of the vehicle can compose displaying the calculated change in the pitch direction and the roll direction of the vehicle as angles.

In some embodiments, the method can additionally comprise providing a conversion function to permit the changing of the system used for measurements c between U.S. Customary System and the Metric System. In some embodiments, the method can additionally comprise saving a given pitch angle measurement on at least one of the smart device or the sensor device to permit later recall for the purpose of returning the vehicle to the given pitch angle position at a later time. In some embodiments, the method can further comprise collecting and storing positional movement information of the vehicle using a global positioning system sensor on the sensor device.

In some embodiments, the method can additionally comprise receiving data at the smart device from one or more vehicle control panels. In some such embodiments, the received data from one or more vehicle control panels can comprise at least one of data regarding holding tank levels or data regarding battery power levels. In some of these embodiments of the method, the smart device can display the data that is generated and displayed on the one or more vehicle control panels.

In some embodiments, the method can additionally comprise activating one or more systems on the vehicle via the software application of the smart device. As described above, the communication between the smart device and the vehicle can be accomplished using a wireless communication system or protocol, such as Bluetooth or WiFi. For example, the one or more systems activated with the smart device can comprise at least one of a lighting system, an entertainment system, a power slideouts system or a generator system.

Figure 10:
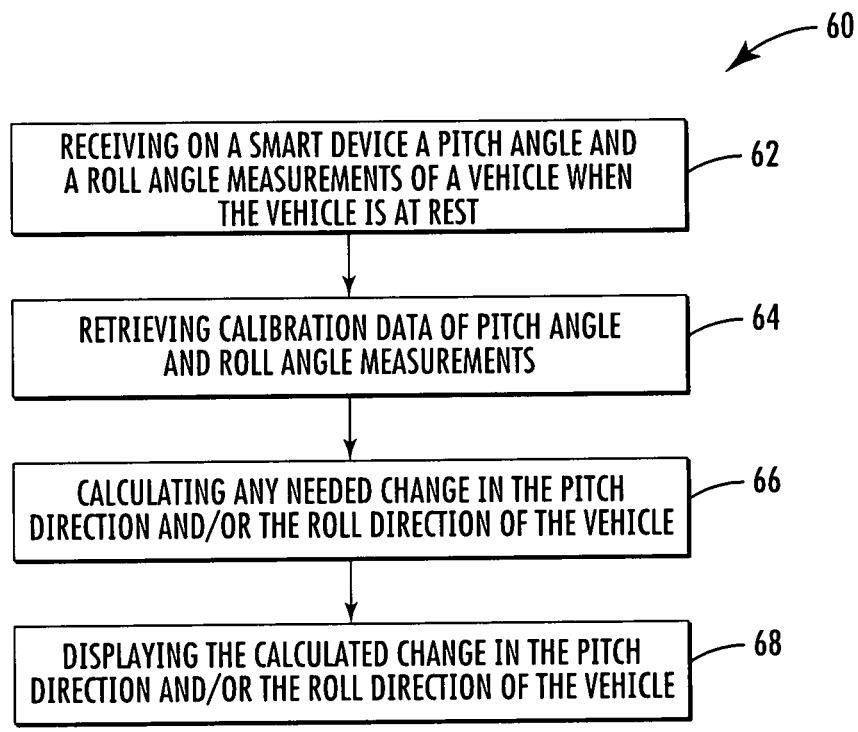
FIG. 10 illustrates an embodiment of a flowchart of a method of leveling a vehicle performed by a software application of a smart device in according to the present subject matter.

As stated above, a software application in the form of a non-transitory computer readable medium can be provided that comprises computer executable instructions embodied in a computer readable medium that when executed by a processor of a computer control the computer to perform the steps similar to the method, generally designated 60, described above. For the example, as shown in FIG. 10, the non-transitory computer readable medium can perform a step 62 of receiving on a smart device a pitch angle measurement and a roll angle measurement of a vehicle when the vehicle is at rest from a sensor device. Additionally, the non-transitory computer readable medium can perform a step 64 of retrieving calibration data of pitch angle and roll angle measurements taken by a sensor device when the vehicle was at an initial level position. The sensor device can comprise a vehicle leveling device or an RV leveling device. The non-transitory computer readable medium can also perform a step 66 of calculating any needed change in at least one of a pitch direction or a roll direction of the vehicle using the calibration data of the pitch and roll angle measurements to obtain a level position of the vehicle. The non-transitory computer readable medium can further perform a step 68 of displaying on the smart device the calculated change in at least one of the pitch direction or the roll direction of the vehicle needed to obtain the level position of the vehicle.

In order to initially develop the calculation data, the method performed by the software application described above can also include the step of determining the initial level position for a vehicle to determine any inconsistencies inherent in the leveling system. In some embodiments, the step of determining an initial level position can comprise receiving measurements of a length and a width of the vehicle. In some embodiments of the software application, the step of determining an initial level position can comprise using at least one of an accelerometer gyroscope, or global positioning system sensor on the smart device to achieve the initial level position. In some embodiments of the method, the step of determining an initial level position can be performed by during manufacture of the vehicle and the calibration data stored on the sensor device installed during manufacture.

The software application can then be used to capture, i.e., identified and stored or saved, the pitch and roll angle measurements from the sensor device taken at the initial level position to provide the calibration data of the pitch and roll angle measurements to permit consideration of any inconsistencies determined when taking measurement readings at a future time. For example, the calibration can be calculated and then saved on a sensor processor on the one or more sensor devices or saved on the smart device that is in communication with the one or more sensor devices. In some embodiments of the software application, the step of capturing the pitch and roll angle measurements from the sensor device can comprise communicating calibration data from the sensor device of the pitch and roll angle measurements measured by the sensor device when the vehicle is at the initial level position to the smart device and saving the calibration data on the smart device. In some embodiments of the software application, the step of capturing the pitch and roll angle measurements from the sensor device can comprise saving the calibration data of the pitch and roll angle measurements measured by the sensor device when the vehicle is at the initial level position on the sensor device. In some such embodiments where the calibration data is saved on the sensor device, the step of saving the calibration data of the pitch and roll angle measurements on the sensor device can comprise transmitting instructions from the smart device to the sensor device to save and store the calibration data of the pitch and roll angle measurements on the sensor device. In some such embodiments, the steps performed by the software application can include recalling the calibration data of the pitch and roll angle measurements from the sensor device to the smart device.

In some embodiments of the software application, the step 68 of displaying the calculated change in at least one of the pitch direction or the roll direction of the vehicle can comprise displaying the calculated change in the pitch direction and the roll direction of the vehicle in measurements of distance. In some embodiments of the software application, the step of displaying the calculated change in at least one of the pitch direction or the roll direction of the vehicle can comprise displaying the calculated change in the pitch direction and the roll direction of the vehicle as angles.

In some embodiments, the steps of the software application can additionally comprise providing a conversion function to permit the changing of the system used for measurements c between U.S. Customary System and the Metric System. In some embodiments, the steps of the software application can additionally comprise saving a given pitch angle measurement on at least one of the smart device or the sensor device to permit later recall for the purpose of returning the vehicle to the given pitch angle position at a later time. In some embodiments, the steps of the software application can further comprise collecting and storing positional movement information of the vehicle using a global positioning system sensor on the sensor device.

In some embodiments, the steps of the software application can additionally comprise receiving data at the smart device from one or more vehicle control panels. In some such embodiments, the received data from one or more vehicle control panels can comprise at least one of data regarding holding tank levels or data regarding battery power levels. In some of these embodiments of the software application, the smart device can display the data that is generated and displayed on the one or more vehicle control panels.

In some embodiments, the steps of the software application can additionally comprise activating one or more systems on the vehicle with the smart device. As described above, the communication between the smart device and the vehicle can be accomplished using a wireless communication system or protocol, such as Bluetooth or WiFi. For example, the one or more systems activated with the smart device can comprise at least one of a lighting system, an entertainment system, a power slideouts system or a generator system.

In some embodiments the software location can also comprise a method to give the leveling system user control over the battery life of the sensor battery to allow the user to extend the life of the battery in use. For example, in some embodiments, the sensor device, i.e., the vehicle leveling device, can be configured to switch between a "sleep mode," where the sensor device is using a minimal amount of power and an "awake mode," where the sensor device is prepared to perform its variety of actions and can connect with the smart device. Thus, the steps of the software application can additionally comprise steps that activate the battery for use through the detection of motion of the vehicle, such as an RV through communication with the sensor device. The sensor device, i.e., the vehicle leveling device, of the leveling system can use motion detected by the accelerometers to change the state of the sensor device between the sleep mode and the awake mode based on certain conditions and user configuration settings. So, in such embodiments, when the sensor device detects motion, the sensor device can transition from the sleep mode to the awake mode and can be connected to the smart device for communication with the leveling system software application. For example, in some embodiments, when in the awake mode the Bluetooth signal is being broadcast which uses more battery power than the sleep mode where the Bluetooth signal is not being broadcast. When the sensor device detects no motion based on a user defined period of time, the sensor goes into the sleep mode to conserve the battery. Thus, in some embodiments, the software application permits the user to define the amount of time, for example, in minutes and/or hours, after no motion is detected that the sensor device will stay in the awake mode before going to the sleep mode. In this manner, the leveling system user can be allowed to configure the leveling system to best suit the user's specific use habits. For example, the software application can provide one or more screen displays that can allow the use to select a motion detection option to transition the sensor device between an awake mode and a sleep mode and can further provide a method of conserving battery life of the sensor device.

An additional aspect that can be employed in some embodiments of the sensor device of the leveling system to conserve battery life is an On/Off switch that is a complete battery disconnect from a circuitry perspective within the sensor device. This battery disconnect can allow the user to turn off the system entirely (to increase battery life) when the sensor is in a setting where motion is constantly being observed, such as when driving or towing the RV for many hours during travel. It can also be used to completely disconnect the battery during RV storage periods. Thus, the sensor device can comprise an On/Off switch that permits the disconnection of the battery from the circuitry, for example, from a PCB of the sensor device as described above, of the sensor device to conserve battery life. The sensor can also comprise a sounder device that can be mounted on a PCB of the sensor device that chirps an audible sound when the On/Off switch is moved into the On position. This audible sound can be used to indicate that the currently installed battery is still good. In some embodiments, this audible sound can be used to indicate that the sensor is now in a Bluetooth pairing mode. Pairing mode can be used to associate the original or additional smart device with a given sensor device of the leveling system.

The leveling system and software application can provide a custom pairing mode to associate the sensor device of a given leveling system with a specific smart device. For example, the sensor device of a leveling system can be assigned a serial number. During use, for example, during configuration of the software application and/or installation of the sensor device, the serial number from the sensor can be recorded on the smart device. Once a smartphone or tablet has bean associated with a particular sensor, then it will only communicate with that sensor, for example, until it is changed by the user. In this manner, the sensor device of a leveling system on an RV can be assured to connect to the RV user's smart device and not to other possible sensors within a given camping area. For example, in some embodiments, the software application can provide a screen display that will allow the user to enter the serial number for the sensor device of the leveling system installed on the RV into the smart device. Once the serial number for that sensor device has been entered, the smart device of the user when using the software application will communicate with the sensor device of the leveling system installed on the RV of the user and not some other sensor device within the area where the RV is being set up for use.

Another aspect of the leveling system and the software application for the leveling system that some embodiment may have is the ability of the use to define the driver's side of the vehicle. By being able to define which side of the RV is the driver's side, especially for motorized RV's, the leveling system can be used in a variety of countries regardless of the types of cars used within a particular country and the country's laws regarding which side of road a vehicle is drive on. For example, by allowing the leveling system user to select the driver's side of the his or her RV, the same leveling system and leveling system software application can be in countries that require vehicles to be driven on the right side of the road or in countries that require vehicles to be driven on the left side of the road. For example, in some embodiments, the software application can include a default setting, for example, that the driver's side of the RV is on left side of the vehicle and the passenger's side is on the right of the vehicle. In some embodiments, the software application can include a screen display that will allow the user to change the default setting of the driver's side or allow the user to select which side is the driver's side and/or passenger side of the RV. Once the driver's side is changed or selected, the references for the driver's side and the passenger's side of the RV are set for use with the particular RV so that software application reads properly for that user. The references can also change for the installation orientation selections to match the currently selected drivers side of the vehicle.

As described above, the vehicle leveling devices and leveling systems can be used on either towable recreational vehicles and motorized recreational vehicles. Another specific embodiment of a leveling system and software application is described with reference to FIGS. 11 and 12. As another example shown in FIG. 11, an embodiment of a motorized RV 70 having a front 71, a rear 73, a driver side (first section) 75, and a passenger side (second section) 77 can be provided that can be adjusted in pitch rotational directions depend on the inclination of the RV 70 from front-to-back and roll rotational directions depending on the inclination of the RV 70 from side-to-side using leveling systems and devices in a similar manner as described above. The RV 70 can comprise a front driver side wheel 72, a front passenger side wheel 74, a rear driver side wheel 76, and a rear passenger side wheel 78. To accomplish the adjustments so that, upon parking the RV 70, the RV 70 will be leveled in both the pitch and roll directions, a leveling system 80 can be provided that provides measurements to determine the amount of adjustment needed in both the pitch and roll directions. For example, the leveling system 80 can comprise one or more sensor devices 82 (shown schematically in dotted lines as a box within the RV 70) that can be secured to the RV 70 to sense the inclination and/or orientation of the RV 70 in both the pitch and roll directions. The sensor device 82 can comprise a vehicle leveling device.

Figure 11:
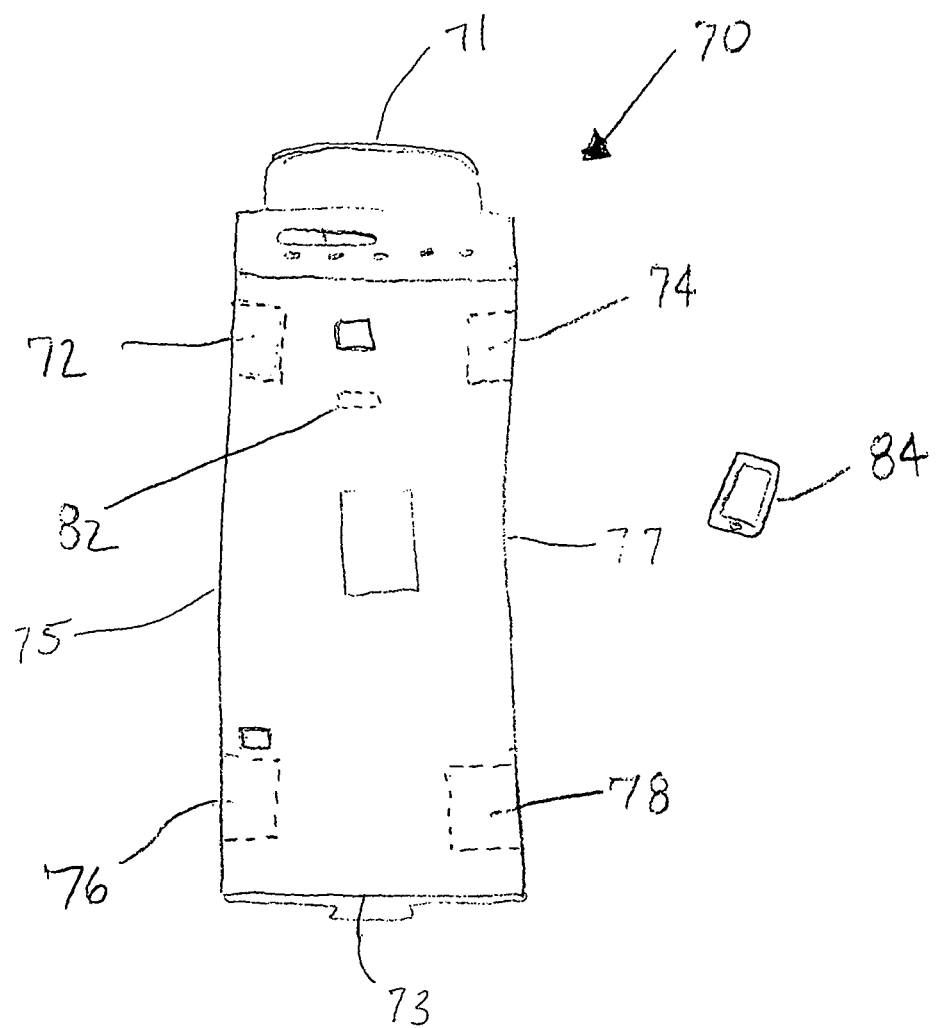
FIG. 11 illustrates a schematic top plan view of an embodiment of a vehicle that includes an embodiment of a leveling system according to the present subject matter.

Additionally, the leveling system 80 can also comprise a smart device 84 that can be in communication with the sensor device 82. For example, the smart device 84 can have a specific software application thereon that include one or more aspect of the software application described above that allows information received from the sensor device 82 about the inclination and/or orientation of the RV 70 to be processed to provide measurements to a user and to determine the amount of adjustments needed to the RV 70. The smart device 84 and the sensor device can communicate with each other in a variety of ways. For example, in some embodiments, the sensor device 82 and smart device 84 can communicate through a wired connection. In some embodiments as shown in FIG. 11, the sensor device 82 and smart device 84 can communicate through wireless communications, such as Bluetooth.

Figure 12:
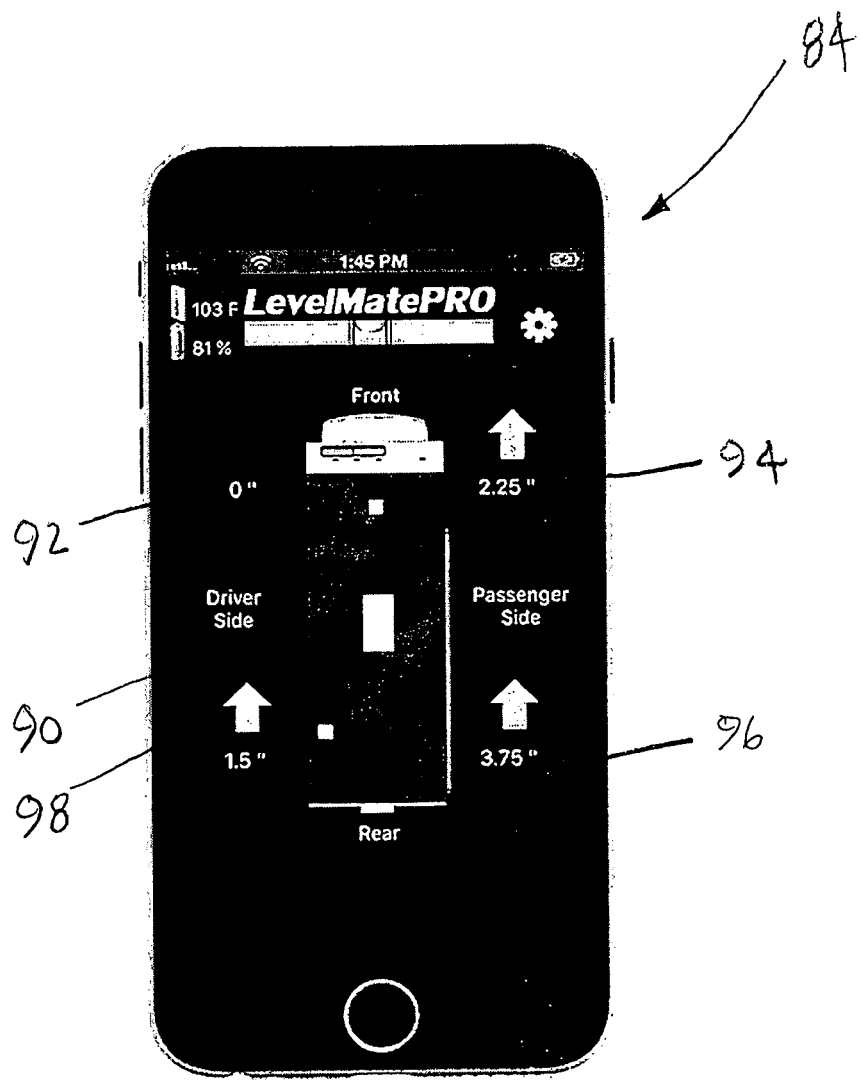
FIG. 12 illustrates another screen shot of an embodiment of a software application on a smart device for use in an embodiment of the leveling system according to the present subject matter.

Once the leveling system 80 has calculated the change of elevation height needed in the roll direction and the pitch direction, the smart device can determine how much each tire needs to be raised to level the RV 70. In particular, the software application can display on the smart device the height required to reach a level position (or each wheel 72, 74, 76, 78 as shown in FIG. 12 at 92, 94, 96, and 98 respectively. Those heights are calculated in a similar manner to the calculated roll and pitch elevation heights as described in the embodiments above. FIG. 12 is a screen shot of a display that shows a schematic representation of the motorized RV 70 from above and can be used to display the amount of adjustment in height of each wheel 72, 74, 76, 78 of the motorized RV 70 based on the measurements taken by the vehicle leveling device 84 and the calculations of the changes in height needed in the roll direction and the pitch direction.

For example, referring to FIG. 12, if the calculated roll height required is an upward elevation on the passenger side of two and a quarter (2.25) inches and the calculated pitch height required is an upward elevation in the rear of one and a half (1.5) inches, then either the smart device 84 or the vehicle leveling device 82 can calculate the movement needed for each wheel of the RV 70 using this information. Based on these adjustment calculations for the change in the height needed in the roll direction and the pitch direction, the adjustment height of each wheel 72, 74, 76, 78 can be calculated by either the smart device 84 or the vehicle leveling device 82. The smart device 84 or the vehicle leveling device 82 can determine which wheel would be considered the pivot point, i.e., the wheel that needs no adjustment for the RV 70 to reach a level position. In some embodiments, the smart device 84 can do these calculations. In some embodiments, the vehicle leveling device, or sensor device, 82 can do these calculations.

In the example above as shown in FIG. 12, the driver side front wheel would be the pivot point and the display from the software application on screen of the smart device would show a zero (0) inch height adjustment of the frame of the motorized RV 70 required at or near the driver front wheel 72 (see FIG. 11) as shown at 92 in FIG. 12, since the motorized RV 70 needs an adjustment of height (two and a quarter (2.25) inches as explained above) on the passenger side 77 and an adjustment of height (one and a half (1.5) inches as explained above) in the rear 73 of the RV 70. Based on the measurements made by the vehicle leveling device 82, the smart device 84 or the vehicle leveling device 82 can also determine the change in elevation of height of the frame of the motorized RV 70 required at or near the other three wheels 74, 76, 78. In this example, the frame of the motorized RV 70 at or near the passenger front wheel 74 would need a two and a quarter (2.25) inches adjustment in height as show at 94 in the display in FIG. 12 and the frame of the motorized RV 70 at or near the passenger side rear wheel would need a three and a three quarter (3.75) inches adjustment in height as show at 96 in the display in FIG. 12, while the frame of the motorized RV 70 at or near the driver side rear wheel 76 would need a one and a half (1.5) inches adjustment in height as show at 98 in the display in FIG. 12.

The adjustment of height to the frame of the motorized RV 70 proximate to each wheel 72, 74, 76, 78 of the RV 70 can be accomplished in different manners. For example, in some embodiments, the wheels 72, 74, 76, 78 of the RV 70 can be placed or driven onto blocks or stacks of blocks. In some embodiments, the RV 70 can have one more jacks that can extend downward from the frame proximate to the wheels 72, 74, 76, 78 of the RV 70 that can be used to adjust the height of the frame of the RV 70. In some embodiments, one or more jacks can be placed proximate to the wheels 72, 74, 76, 78 of the RV 70 to adjust the height of the frame of the RV 70.

Thus, the calculated adjustment proximate to each wheel is the sum of the calculated change in the height in the roll direction and the pitch direction for the given position of the respective wheel. Thus, the calculated change in height of the frame of the motorized RV 70 proximate to the front driver side wheel 72 is the sum of any calculated adjustment in height at the front 71 of the RV 70 and on the driver side 75 of the RV 70. Additionally, the calculated change in height of the frame of the motorized RV 70 proximate to the front passenger side wheel 74 is the sum of any calculated adjustment in height at the front 71 of the RV 70 and on the passenger side 77 of the RV 70. Similarly, the calculated change in height of the frame of the motorized RV 70 proximate to the rear driver side wheel 76 is the sum of any calculated adjustment in height at the rear 73 of the RV 70 and on the driver side 75 of the RV 70, while the calculated change in height of the frame of the motorized RV 70 proximate to the rear passenger side wheel 78 is the sum of any calculated adjustment in height at the rear 73 of the RV 70 and on the passenger side 77 of the RV 70.

These and other modifications and variations to the present subject matter may be practiced by those of ordinary skill in the art, without departing from the spirit and scope of the present subject matter, which is more particularly set forth herein above. In addition, it should be understood the aspects of the various embodiments may be interchanged both in whole and in part. Furthermore, those of ordinary skill in the art will appreciate that the foregoing description is by way of example only, and is not intended to limit the present subject matter.

What is claimed is:

1. A system for leveling a vehicle, the system comprising:
   a sensor device secured to a vehicle to sense an inclination of the vehicle in both a pitch direction and a roll direction when the vehicle is parked on an uneven surface of the ground, the sensor device comprising a printed circuit board that includes:
      a digital accelerometer that permits calculation in both the pitch direction and roll direction, and
      a processor to process data collected by the digital accelerator; and
   a smart device in wireless communication with the sensor device, the smart device including a display screen;
   wherein, based on the inclination of the vehicle as sensed by the sensor device, at least one of the sensor device and smart device is configured to determine adjustment pairs, each adjustment pair including a height adjustment amount and a corresponding adjustment direction needed to level a respective section of the vehicle by movement of the respective section of the vehicle with respect to the uneven surface of the ground by the height adjustment amount in the corresponding adjustment direction;
   wherein the display device of the smart device is configured to display at least one image representative of the vehicle and showing the respective sections of the vehicle and to simultaneously display the height adjustment amount and corresponding adjustment direction of each adjustment pair adjacent to each respective section of the vehicle shown in the at least one image; and
   wherein the smart device is further configured to update the display screen, substantially in real time, as one or more of the height adjustment amounts are changed.

2. The system according to claim 1, wherein the smart device and the sensor device communicate with each other through a wireless connection and the smart device is configured to receive a serial number of the sensor device so that the smart device communicates with the particular sensor device.

3. The system according to claim 1, wherein the adjustment indicators show the adjustments in height to at least one part of a frame of the vehicle located at or near at least one of four wheels of the vehicle.

4. The system according to claim 3, wherein the smart device is configured to calculate a first adjustment in height to level the vehicle in the pitch direction and a second adjustment in height to level the vehicle in the roll direction, and wherein the smart device is further configured to calculate the adjustments in height to the at least one part of the frame of the vehicle by adding the first adjustment with the second adjustment.

5. The system according to claim 4, wherein:
   the at least one part of the frame includes a first part located at or near a front driver-side wheel, a second part located at or near a back driver-side wheel, a third part located at or near a front passenger-side wheel, and a fourth part located at or near a back passenger-side wheel;
   an adjustment in height, if any, to the first part includes combining a rearward pitch adjustment of the first adjustment with a right roll adjustment of the second adjustment;
   an adjustment in height, if any, to the second part includes combining a forward pitch adjustment of the first adjustment with the right roll adjustment of the second adjustment;
   an adjustment in height, if any, to the third part includes combining the rearward pitch adjustment of the first adjustment with a left roll adjustment of the second adjustment; and
   an adjustment in height, if any, to the fourth part includes combining the forward pitch adjustment of the first adjustment with the left roll adjustment of the second adjustment.

6. The system according to claim 1, wherein the smart device is further configured to display on the display screen near-real-time height adjustments remaining that are needed to level the vehicle when the vehicle is in the process of being leveled.

7. The system according to claim 1, further comprising a temperature calibration lookup table, wherein the smart device is configured to correct the height adjustment amounts based on current temperature readings and information from the temperature calibration lookup table.

8. The system according to claim 1, wherein the vehicle includes four wheels, and wherein at least one of the sensor device and smart device is configured to determine, based on the height needed to level the vehicle in both the pitch direction and the roll direction, adjustments in height to at least one of four parts of a frame of the vehicle, the four parts of the frame located at or near the four wheels of the vehicle.

9. The system according to claim 1, wherein the information sensed by the sensor device regarding the inclination of the vehicle in both the pitch direction and the roll direction is processed to determine an amount of adjustment in height to a rear section or front section of the vehicle needed to level the vehicle in the pitch direction and to determine an amount of adjustment in height to a first side section or a second side section of the vehicle needed to level the vehicle in the roll direction.

10. A method for leveling a recreational vehicle, the method comprising:
    sensing an inclination of the recreational vehicle in both a pitch direction and a roll direction when the recreational vehicle is parked on an uneven surface of the ground;
    based on the sensed inclination of the recreational vehicle, determining adjustment pairs, each adjustment pair including a height adjustment amount and a corresponding adjustment direction needed to level a respective section of the recreational vehicle by movement of the respective section of the recreational vehicle with respect to the uneven surface of the ground by the height adjustment amount in the corresponding adjustment direction;

displaying at least one image, representative of the recreational vehicle and showing the respective sections of the recreational vehicle, on a display screen of a smart device;

simultaneously displaying the height adjustment amount and corresponding adjustment direction of each adjustment pair on the display screen adjacent to each respective section of the recreational vehicle in the at least one image; and updating the display screen, essentially in real time, as the height adjustment amounts are changed.

11. The method according to claim 10, wherein the step of sensing the inclination of the recreational vehicle in both a pitch direction and a roll direction is performed by a corresponding sensor device, and wherein the smart device and the corresponding sensor device communicate with each other through a wireless connection, the method further comprising storing a serial number of the corresponding sensor device in the smart device so that the smart device communicates with the corresponding sensor device.

12. The method according to claim 10, further comprising:
   calculating a first adjustment in height to level the vehicle in the pitch direction;
   calculating a second adjustment in height to level the vehicle in the roll direction;
   calculating any needed adjustment in height to a first part of the frame located at or near a front driver-side wheel by combining a rearward pitch adjustment of the first adjustment and a right roll adjustment of the second adjustment;
   calculating any needed adjustment in height to a second part of the frame located at or near a rear driver-side wheel by combining a forward pitch adjustment of the first adjustment and the right roll adjustment of the second adjustment;
   calculating any needed adjustment in height to a third part of the frame located at or near a front passenger-side wheel by combining the rearward pitch adjustment of the first adjustment and a left roll adjustment of the second adjustment; and
   calculating any needed adjustment in height to a fourth part of the frame located at or near a rear passenger-side wheel by combining the forward pitch adjustment of the first adjustment and the left roll adjustment of the second adjustment.

13. The method according to claim 10, further comprising the step of displaying on the display screen near-real-time height adjustments remaining that are needed to level the vehicle when the vehicle is in the process of being leveled.

14. The method according to claim 10, further comprising the step of correcting the height adjustment amounts based on current temperature readings and information from a temperature calibration lookup table.

15. A non-transitory computer readable medium comprising computer executable instructions that, when executed by a processor of a smart device, control the smart device to perform steps comprising:

receiving a pitch angle measurement and a roll angle measurement of a vehicle from a sensor device secured to the vehicle when the vehicle is parked on an uneven surface of the ground;

based on the pitch angle measurement and roll angle measurement, calculating adjustment pairs, each adjustment pair include a height adjustment amount and a corresponding adjustment direction needed to level the vehicle by movement of the respective section of the vehicle with respect to the uneven surface of the ground by the height adjustment amount in the corresponding adjustment direction; and displaying, on a display screen of the smart device, at least one image representative of the vehicle and showing the respective sections of the recreational vehicle;

simultaneously displaying, on the display screen of the smart device, the height adjustment amount and corresponding adjustment direction of each adjustment pair adjacent to each respective section of the vehicle in the at least one image; and updating the display screen of the smart device, essentially in real time, as the height needed to adjust the vehicle to level the vehicle changes.

16. The non-transitory computer readable medium according to claim 15, wherein the step of displaying the adjustment in height comprises the step of displaying, on the display screen of the smart device, the needed adjustment in height of at least one portion of a frame of the vehicle at or near at least one wheel position of the vehicle.

17. The non-transitory computer readable medium according to claim 15, wherein the computer executable instructions, when executed, further control the smart device to:
   calculate a first adjustment in height to level the vehicle in the pitch direction and a second adjustment in height to level the vehicle in the roll direction; and
   calculate adjustments in height to each of at least one part of a frame of the vehicle by combining the first adjustment with the second adjustment.

18. The non-transitory computer readable medium according to claim 17, wherein the at least one part of the frame includes a first part located at or near a front driver-side wheel, a second part located at or near a back driver-side wheel, a third part located at or near a front passenger-side wheel, and a fourth part located at or near a back passenger-side wheel, and wherein the computer executable instructions, when executed, further control the smart device to:
   calculate any needed adjustment in height to the first part by combining a rearward pitch adjustment of the first adjustment with a right roll adjustment of the second adjustment;
   calculate any needed adjustment in height to the second part by combining a forward pitch adjustment of the first adjustment with the right roll adjustment of the second adjustment;
   calculate any needed adjustment in height to the third part by combining the rearward pitch adjustment of the first adjustment with a left roll adjustment of the second adjustment; and
   calculate any needed adjustment in height to the fourth part by combining the forward pitch adjustment of the first adjustment with the left roll adjustment of the second adjustment.

19. The non-transitory computer readable medium according to claim 15, wherein the computer executable instructions, when executed, further control the smart device to display, in near real time, height adjustments that are remaining for leveling the vehicle during a vehicle leveling process.

20. The non-transitory computer readable medium according to claim 15, wherein the computer executable instructions, when executed, further control the smart device to correct the adjustments in height based on current temperature readings and information from a temperature calibration lookup table.

\* \* \* \* \*